United States Patent
De Baere et al.

(10) Patent No.: US 6,370,126 B1
(45) Date of Patent: *Apr. 9, 2002

(54) MOBILE SATELLITE COMMUNICATIONS SYSTEM WITH LOCAL AND GLOBAL NETWORK

(75) Inventors: Jan De Baere, Zundert (NL); Nicholas Hart, Wahroonga (AU)

(73) Assignee: Inmarsat, Ltd. (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,128

(22) PCT Filed: May 12, 1995

(86) PCT No.: PCT/GB95/01087

§ 371 Date: Aug. 28, 1997

§ 102(e) Date: Aug. 28, 1997

(87) PCT Pub. No.: WO96/16488

PCT Pub. Date: May 30, 1996

(30) Foreign Application Priority Data

Nov. 18, 1994 (GB) .............................. 9423950

(51) Int. Cl.[7] .............................................. H04B 7/185
(52) U.S. Cl. ...................... 370/316; 370/354; 370/401; 379/221; 455/12.1
(58) Field of Search ................................. 370/235, 236, 370/316, 324, 328, 331, 332, 401, 354; 455/406, 422, 12.1, 13.1, 13.2, 13.3, 33.1, 33.2; 379/220, 221; 709/239

(56) References Cited

U.S. PATENT DOCUMENTS

| | | | |
|---|---|---|---|
| 4,980,677 A | | 12/1990 | Hotta et al. |
| 5,303,286 A | * | 4/1994 | Wiedeman ................. 455/12.1 |
| 5,327,572 A | | 7/1994 | Freeburg |
| 5,625,867 A | | 4/1997 | Rouffet et al. |

FOREIGN PATENT DOCUMENTS

| | | |
|---|---|---|
| DE | 37 06 240 A1 | 9/1988 |
| EP | 0 331 162 | 3/1989 |

(List continued on next page.)

OTHER PUBLICATIONS

Weideman et al., "The Globalstar Mobile Satellite System For Worldwide Personal Communications", NASA Reference Publication 1274, pp. 290–297, Feb. 1992.

Hatlelid et al., "The Iridium™ System Personal Communications Anytime, Anyplace", pp. 285–290.

(List continued on next page.)

Primary Examiner—Wellington Chin
Assistant Examiner—Frank Duong
(74) Attorney, Agent, or Firm—Banner & Witcoff, Ltd.

(57) ABSTRACT

A communication system for communication with a plurality of mobile terminals. A plurality of earth stations are arranged to communicate with mobile users via a plurality of orbiting satellites. A plurality of gateway stations interconnect terrestrial equipment with the earth stations and a store stores access data for the mobile terminals. The mobile terminals are divided into first and second categories, the store retaining corresponding different status information and both the first and second categories communicating with the satellites. Also provided are first and second different communication channels between the gateway stations and the earth stations, and a route control system for selecting one of the first and second channels, in dependence upon the category of a mobile terminal.

40 Claims, 15 Drawing Sheets

FOREIGN PATENT DOCUMENTS

| EP | 0 317 974 | 5/1989 |
|---|---|---|
| EP | 0 503 813 A2 | 3/1992 |
| EP | 0 506 255 A2 | 9/1992 |
| EP | 0 536 033 A2 | 9/1992 |
| EP | 0 536 921 A1 | 9/1992 |
| EP | 0 617 566 A1 | 8/1993 |
| EP | 0 562 374 A1 | 9/1993 |
| EP | 0 568 778 A2 | 11/1993 |
| EP | 0 658 014 A1 | 12/1994 |
| GB | 2 275 588 A | 2/1994 |
| GB | 2 281 014 A | 8/1994 |
| WO | WO 91/15071 | 3/1991 |
| WO | WO 92/00632 | 3/1991 |

OTHER PUBLICATIONS

Balasekar et al., "Adaptive Map Configuration and Dynamic Routing to Optimize the Performance of a Satellite Communication Network", IEEE, pp. 986–988, dated 1993.

Priscoli, Delli F., "Architecture of an Integrated GSM–Satellite System", European Tarnsactions on Telecommunications and Related Technologies, vol. 5, No. 5, pags 91–99, XP000470682, 1994.

Leopold R. J. et al., The Iridium™/SM Communications System, IEEE MTS International Microwave Symposium Digest, vol. 2, pp. 575–578, XP000630487, 1993.

Re Del E., et al., "Architectures and Protocols for an Integrated Satellite–Terrestrial Mobile System", Proceedings of the International Mobile Satellite Conference, pp. 137–142, XP000600725, 1993.

Corazza, G.E., "Handover Procedures In Integrated Satellite And Terrestrial Mobile Systems", Proceedings of the International Mobile Satellite Conference, pp. 143–148, XP002017345, 1993.

* cited by examiner

FIG.6.
| ID # | STATUS | POSITION | ACTIVE NODE | AVAIL ? | HOME |
|---|---|---|---|---|---|
| 00001 | LOCAL | 46°, 35° | 6a | Y | 8a |
| | | | | | |
| | | | | | |
| | | | | | |
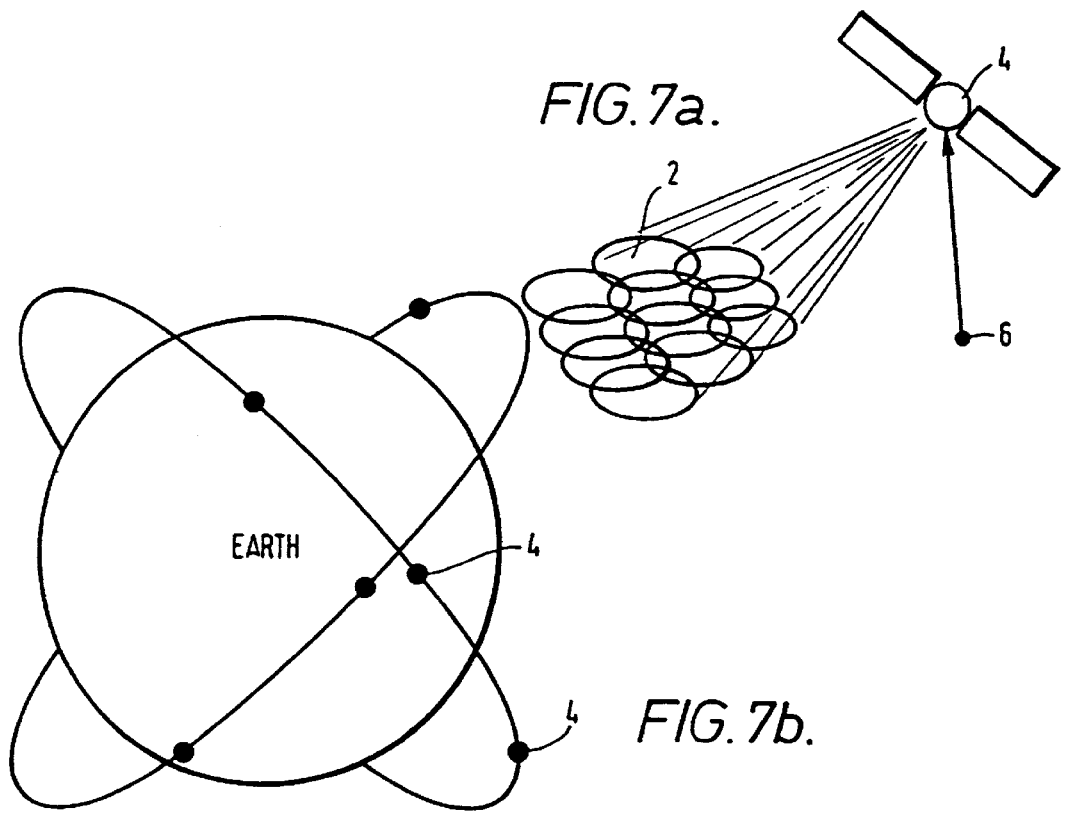
FIG.7a.
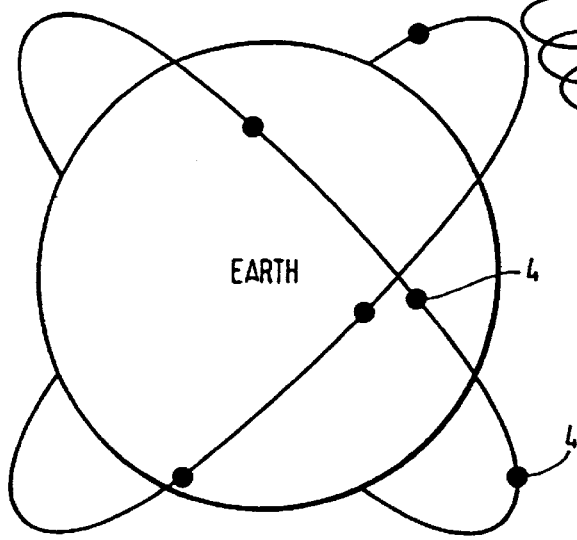
FIG.7b.

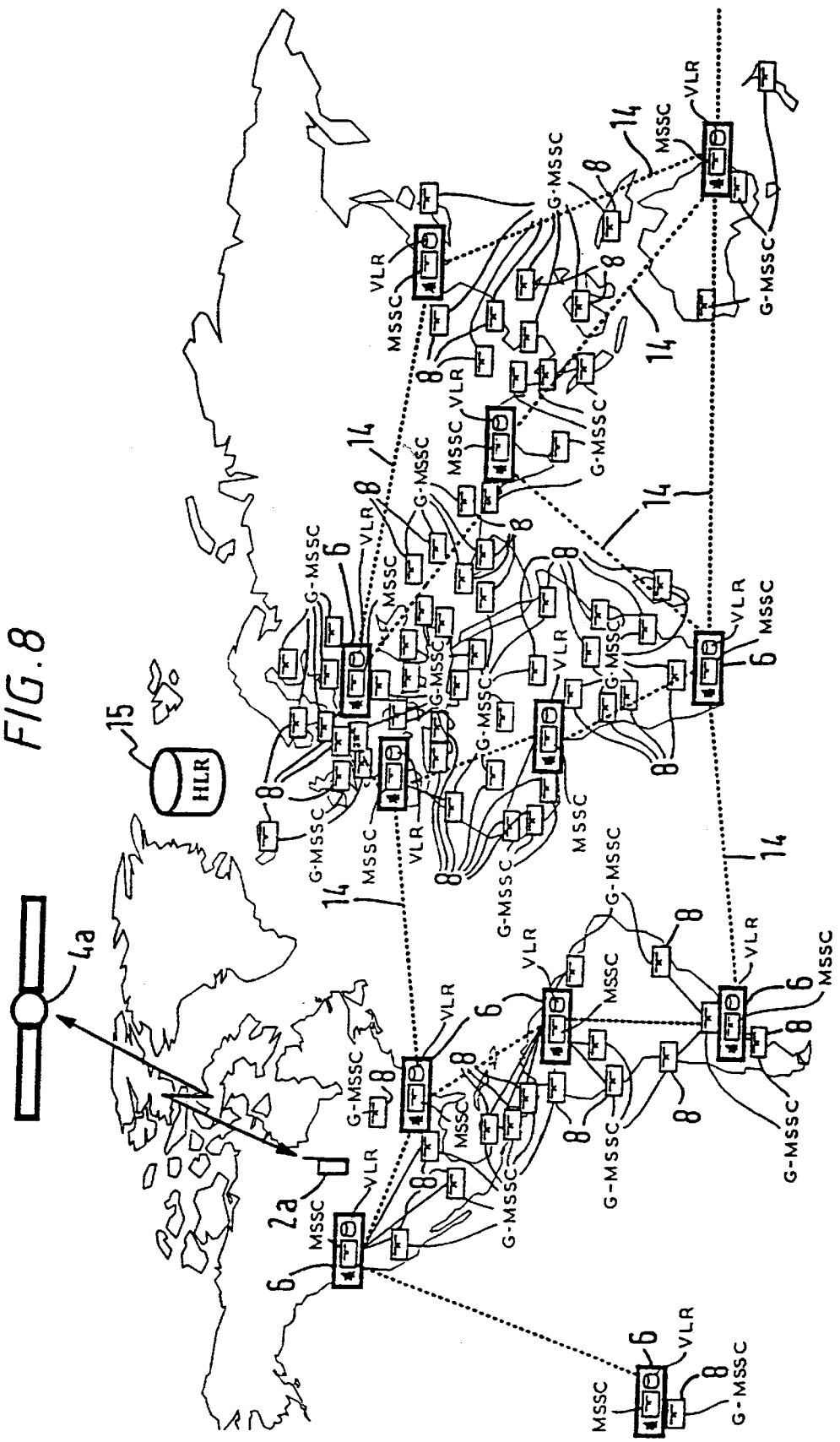

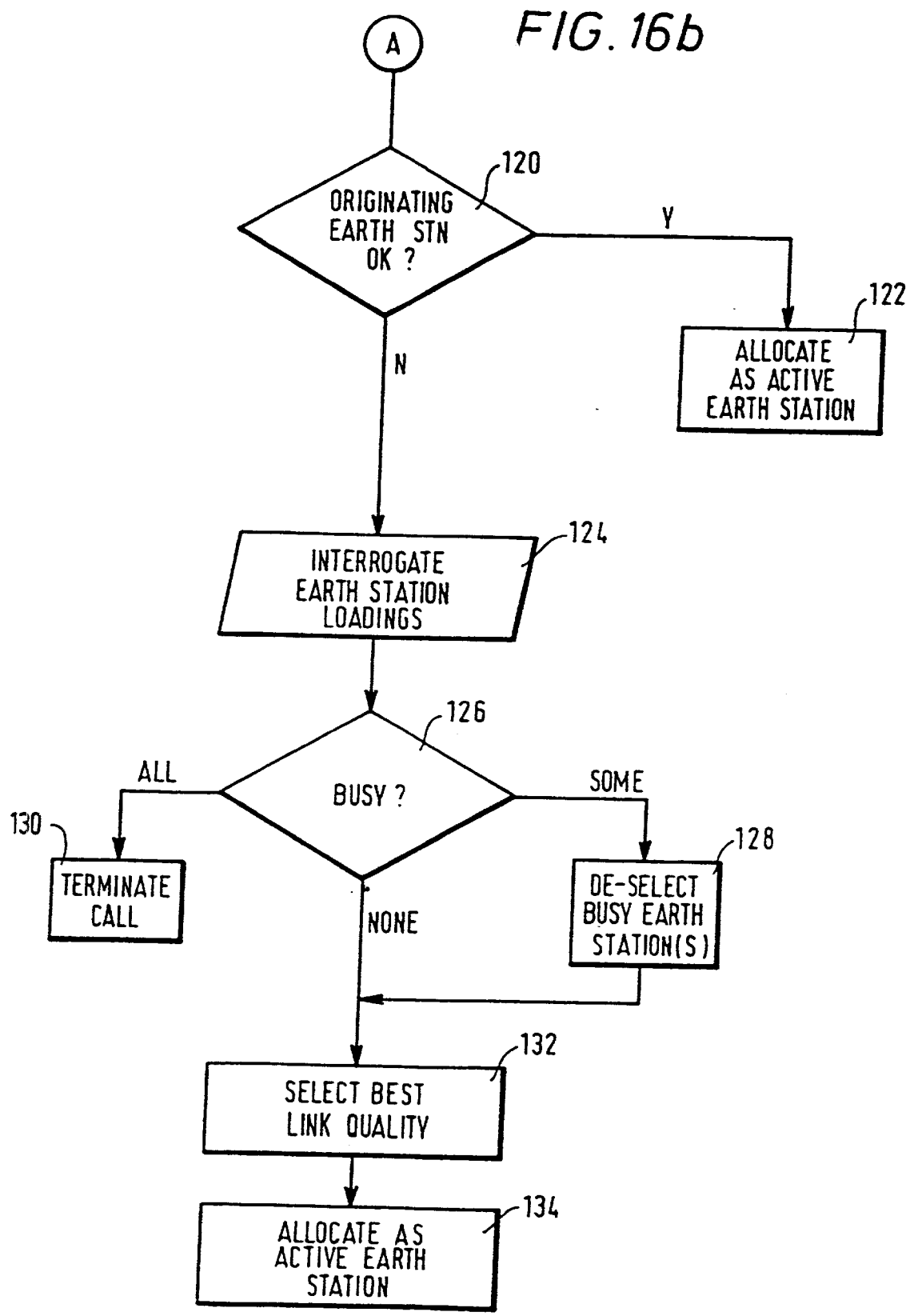

MOBILE SATELLITE COMMUNICATIONS SYSTEM WITH LOCAL AND GLOBAL NETWORK

FIELD OF THE INVENTION

This invention relates to communications with a mobile user, and in particular to such communications in which the link to the mobile user is via a satellite or satellites.

BACKGROUND ART

US 4189675 proposes a satellite communications method and apparatus for communicating with mobile users using a network of satellite in predetermined orbits. It would be possible to provide a complete communications network using only satellites, by utilising satellite-to-satellite links. However, both power and bandwidth are at a premium in satellite communications, and the capacity of such a network would therefore be small. It has therefore been proposed to employ ground components to form part of the link between one user and another.

A problem which arises is that of knowing where a mobile user is, in other words, to which satellite (and, with multi beam satellites, which beam) a call to that user should be directed. This problem is similar to that arising in the context of international terrestrial cellular radio systems, such as the GSM system. In that system, a register is maintained in a store of the locations of mobile users.

EP 0562374 and EP 0568778 are believed to describe the call set up method used in the "Iridium" proposed satellite cellular mobile communication system. They describe a network in which information on the position of a mobile user is maintained at the ground switching office which is currently serving the mobile user, and also at a "home" station for each particular mobile subscriber. When a call is placed to a particular mobile subscriber, either the satellite switching office to which the call is first routed is the/one currently serving the subscriber (in which case the call is placed directly via the satellite to the subscriber), or the switching office contacts the "home" station for the subscriber, and obtains the details of the current switching office serving the subscriber, to which the call is routed (although it is not clear in what manner the routing occurs).

An alternative description of the "Iridium" proposals is given in the paper "The Iridium (TM) system personal communications anytime, any place" J. E. Hatlelid and L. Casey, Proceedings of the Third International Mobile Satellite Conference IMC 93, 16–18 June 1993, pages 285–290, which reveals that it is proposed that the Iridium satellite cellular system is intended to operate with terrestrial cellular radio, and that calls will be transmitted via a satellite only if terrestrial cellular communication is not available.

An alternative proposed satellite cellular system is described in "The Globalstar Mobile Satellite System for Worldwide Personal Communications", R. A. Weideman, pages 291–296 of the Conference Proceedings mentioned above. Two alternative access network schemes, invented by the author of that paper, and believed to have been proposed for use in the proposed Globalstar system, are described in EP 0536921 and EP 0506255. In the former of these, each mobile user is allocated a "home" gateway station, containing information on that user. Additionally, each gateway contains information on all mobile users currently in its area.

Calls are directed to the users home gateway station. If this is the gateway station within the area of which the user is currently located, the call is then routed to the mobile user by satellite. If not, the database held at the home gateway station is consulted and the call is re-routed from the home gateway to the active gateway within the area of which the mobile user is located. Details of the rerouting are not given; it is presumably via the public network.

EP 0506255 is similar, but the user information and processing intelligence is located in the satellites, rather than in ground stations.

Both these latter two documents propose to use the satellite link only when a user has registered as "roaming" outside his normal area of operations; whilst inside this area, he is served by a terrestrial cellular communications network.

None of the foregoing publications take account of the technical problems which may arise when a satellite cellular communications system is used for connection to a roaming mobile user who may be located at one of a number of widely dispersed points on the Earth, and who may be called from a fixed telephone at any point across the earth via a public switched telephone network (PSTN).

To give an example, suppose that in the system described in EP 0536921, a mobile user has a home gateway in Australia, but is roaming in the United Kingdom (i.e. on a diametrically opposed point on the planet), and that he is called from a user in the UK. The call would first be routed through the international PSTN from the UK to Australia, to the home gateway, whence it would be re-routed by a further link back to an active gateway in or near the UK, then finally relayed via the satellite to the mobile user. When it is borne in mind that each of the links between the UK and Australia may involve at least one satellite connection via, for example, satellites operated by INTELSAT, it will be seen that at least three "hops", each comprising an earth-satellite-earth round trip are involved. The total delay in the link thus can rapidly become very substantial, with consequent rapid degradation in the perceived quality of the connection. Further, other types of noise, distortion or echo degradation of the signal may also come into play.

SUMMARY OF THE INVENTION

The present invention provides a satellite mobile communications system in which a plurality of terrestrial gateways are interconnected by a dedicated terrestrial ground network; calls to mobile users in a category of users who are entitled to roam globally are routed through the dedicated network to the ground station serving the satellite currently serving the mobile user; and calls directed to a mobile user who is in a category of users not entitled to roam outside a limited geographical area are directed to the ground station serving that geographical area via another network (e.g. the PSTN on which the call arrived).

Thus, for mobile users who may genuinely be located at dispersed locations over time, the call is routed via a dedicated, controlled network which may, for example, consist entirely of terrestrial links, so that the quality of the link to the earth station serving the satellite serving the mobile user can be controlled.

On the other hand, users who will not require global roaming (and whose position is therefore known) can be served predominantly through -the PSTN, since a relatively direct and short route through the public switched telephone network can be set up.

According to another aspect of the invention, there is provided a method of interconnecting a satellite mobile communications system user terminal and another telecommunications user terminal, comprising selecting one from a plurality of possible earth stations via which said satellite system user terminal may communicate via a satellite, and interconnecting the two user terminals via said selected earth station.

The selection of the appropriate ground station may, in one embodiment, be made based on a prediction of link quality taking into account the satellite system user position and the ephemerides of the satellites serving each earth station. It may equally be made taking into account, additionally or alternatively, the measured quality or strength of the link obtainable via each of a plurality of earth stations.

In an embodiment, where several earth stations provide an acceptable link quality, the choice may be made so as to minimise the route to be taken through the ground network (e.g. by making the selected earth station the same as the source or destination earth stations of an incoming or outgoing call, respectively) or to maximise quality through the ground network (e.g. by avoiding long distance links such as satellite links where possible).

BRIEF DESCRIPTION OF THE DRAWINGS

Embodiments of the invention will now be described, by way of example only, with reference to the accompanying drawings, in which:

FIG. 6 illustrates the contents of a store forming part of the database station of FIG. 5;

FIG. 7a illustrates schematically the beams produced by a satellite in the embodiment of FIG. 1;

FIG. 7b illustrates schematically the disposition of satellites forming part of FIG. 1 in orbits around the earth;

FIG. 8 illustrates the geographical disposition of the components of FIG. I on the Earth;

PREFERRED EMBODIMENT

Figure 1:
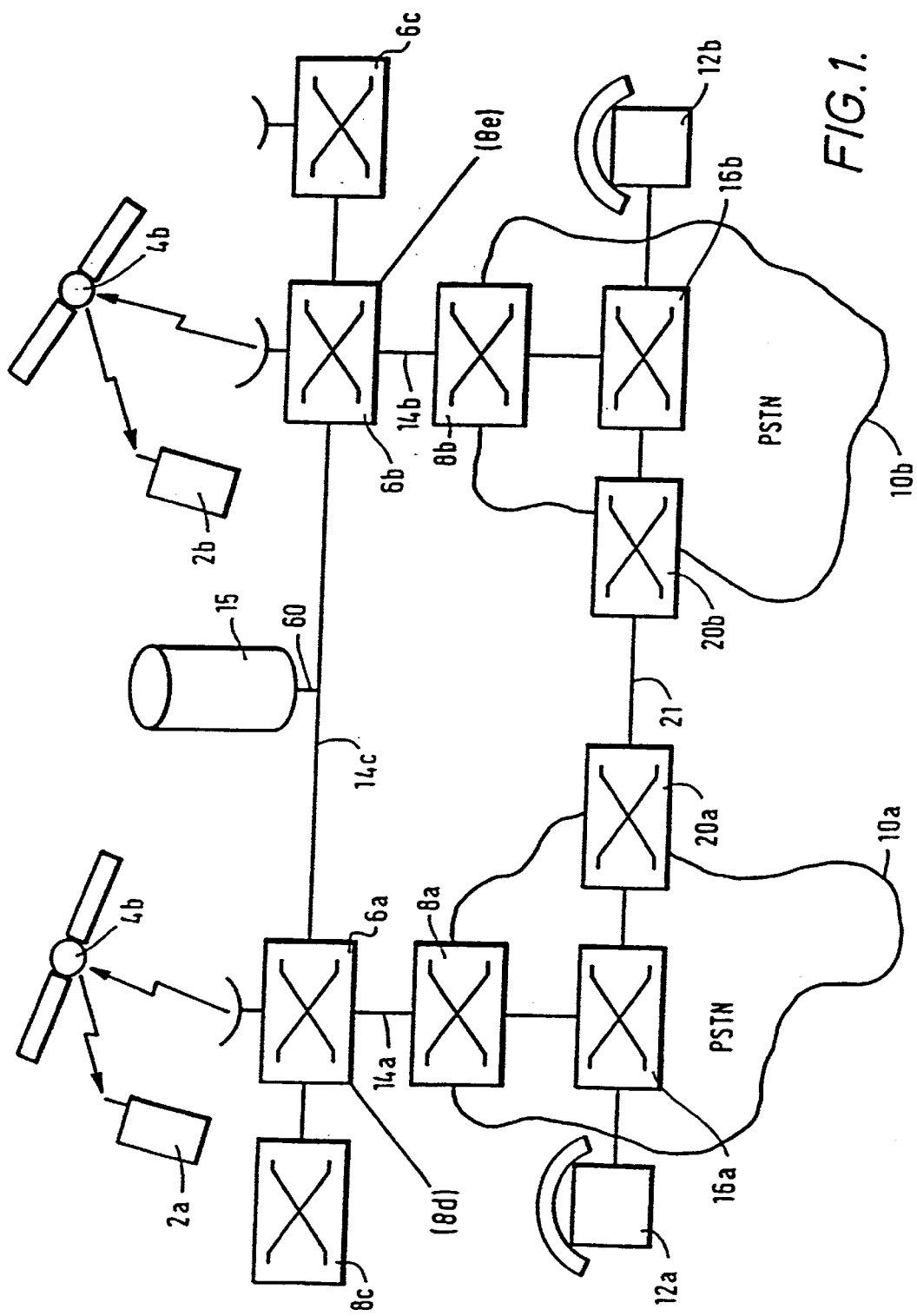
FIG. 1 is a block diagram showing schematically the elements of a communications system embodying the present invention.

Referring to FIG. 1, a satellite communications network according to this embodiment comprises mobile user terminal equipment 2a, 2b; orbiting relay satellites 4a, 4b; satellite earth station nodes 6a, 6b; satellite system gateway stations 8a, 8b; public switched telecommunications networks 10a, 10b; and fixed telecommunications terminal equipment 12a, 12b.

Interconnecting the satellite system gateways 8a, 8b with the earth station nodes 6a, 6b, and interconnecting the nodes 6a, 6b with each other, is a dedicated ground-based network comprising channels 14a, 14b, 14c. The satellites 4, earth station nodes 6 and lines 14 make up the infrastructure of the satellite communications network, for communication with the mobile terminals 2, and accessible through the gateway stations 8.

A terminal location database station 15 is connected, via a signalling link 60 (e.g. within the channels 14 of the dedicated network) to the gateway station and earth stations 6.

The PSTNs 10a, 10b comprise, typically, local exchanges 16a, 16b to which the fixed terminal equipment 12a, 12b is connected via local loops 18a, 18b; and international switching centres 20a, 20b connectable one to another via transnational links 21 (for example, satellite links or subsea optical fibre cable links). The PSTNs 10a, 10b and fixed terminal equipment 12a, 12b (e.g. telephone instruments) are well known and almost universally available today.

Each mobile terminal apparatus is in communication with a satellite 4 via a full duplex channel (in this embodiment) comprising a down link channel and an up link channel, for example (in each case) a TDMA time slot on a particular frequency allocated on initiation of a call, as disclosed in our earlier UK patent applications GB-A-2288913 and GB-A-2293725. The satellites 4 in this embodiment are non geostationary, and thus, periodically, there is hand over from one satellite 4 to another.

Mobile terminal 2

Figure 2:
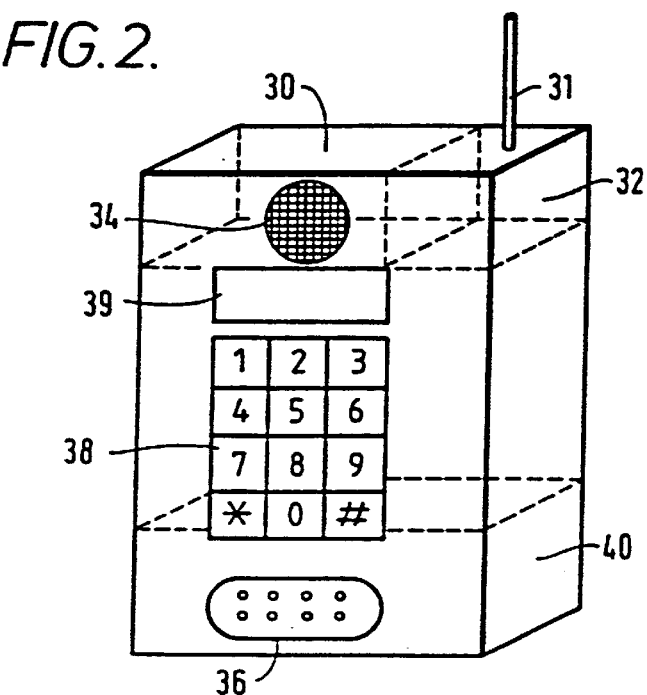
FIG. 2 is a block diagram showing schematically the elements of mobile terminal equipment suitable for use with the present invention.

Referring to FIG. 2, the mobile terminal equipment of FIG. 1 is shown.

One suitable form is a handset, as shown. Details of the handsets 2a, 2b etc do not form part of the present invention, but they may comprise handsets similar to those presently available for use with the GSM system, comprising a digital coder/decoder (CODEC) 30, together with conventional microphone 36, loudspeaker 34, battery 40 and keypad components 38, and a radio frequency (RF) interface 32 and antenna 31 suitable for satellite communications. Preferably a display 39 (for example a liquid crystal display) is also provided. A 'smart card' reader receiving a smart card storing user information may be present.

Earth Station Node 6

The earth station nodes 6 are arranged for communication with the satellites.

Figure 3:
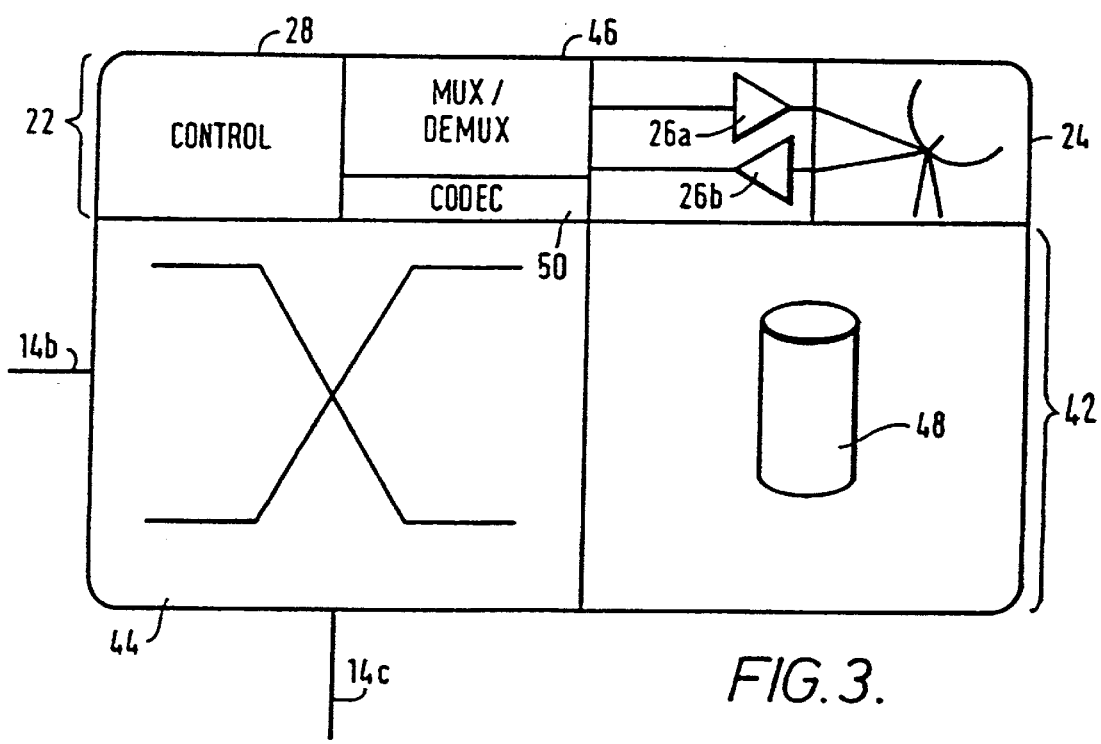
FIG. 3 is a block diagram showing schematically the elements of an Earth station node forming part of the embodiment of FIG. 1.

Each earth station node 6 comprises, as shown in FIG. 3, a conventional satellite earth station 22 consisting of at least one satellite tracking antenna 24 arranged to track at least one moving satellite 4, RF power amplifiers 26a for supplying a signal to the antenna 24, and 26b for receiving a signal from the antenna 24; and a control unit 28 for storing the satellite ephemeris data, controlling the steering of the antenna 24, and effecting any control of the satellite 4 that may be required (by signalling via the antenna 24 to the satellite 4).

The earth station node 6 further comprises a mobile satellite switching centre 42 comprising a network switch 44 connected to the trunk links 14 forming part of the dedicated network. A multiplexer 46 is arranged to receive switched calls from the switch 44 and multiplex them into a composite signal for supply to the amplifier 26 via a low bit-rate voice codec 50. Finally, the earth station node 6 comprises a local store 48 storing details of each mobile terminal equipment 2a within the area served by the satellite 4 with which the nodes 6 is in communication.

Gateway 8

Figure 4:
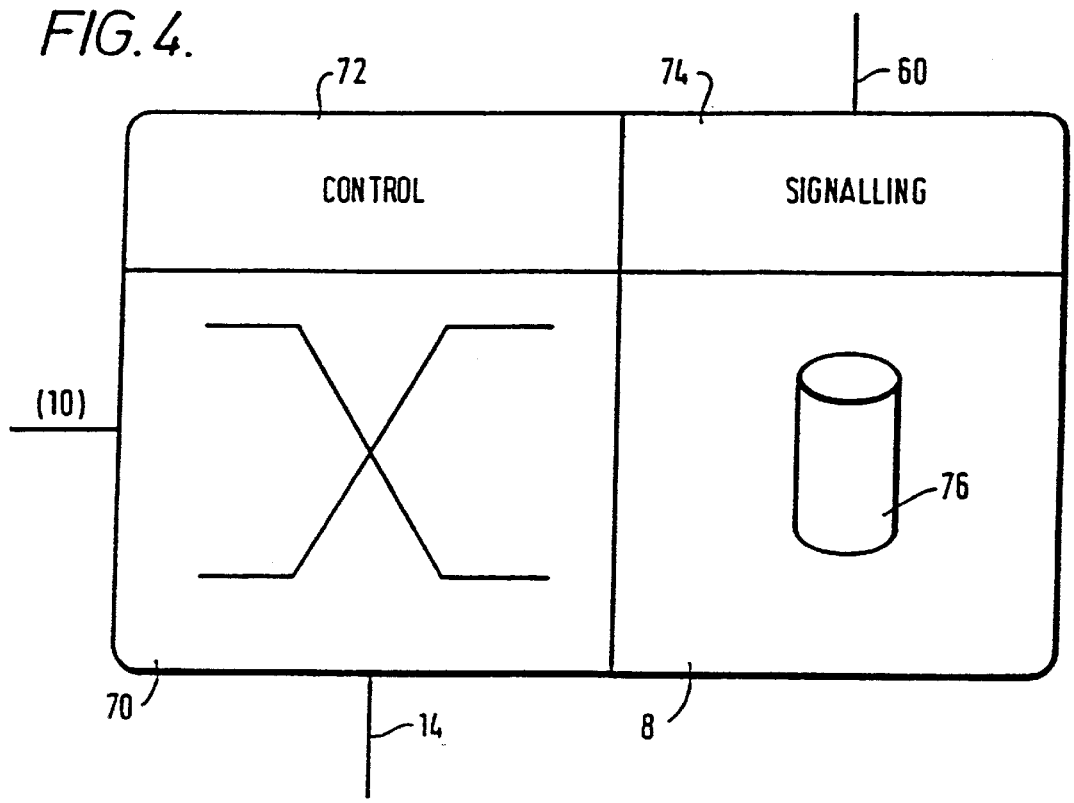
FIG. 4 is a block diagram showing schematically the elements of a gateway station forming part of the embodiment of FIG. 1.

Referring to FIG. 4, the gateway stations 8a, 8b are, in this embodiment, commercially available mobile switch centres (MSCs) of the type used in digital mobile cellular radio systems such as GSM systems. They could alternatively comprise a part of an international or other exchange forming one of the PSTNs 10a, 10b operating under software control to interconnect the networks 10 with the satellite system trunk lines 14.

The gateway stations 8 comprise a switch 70 arranged to interconnect incoming PSTN lines from the PSTN 10 with dedicated service lines 14 connected to one or more Earth station nodes 6, under control of a control unit 72. The control unit 72 is capable of communicating with the data channel 60 connected to the database station 15 via a signalling unit 74, and is arranged to generate data messages in some suitable format (e.g. as packets or ATM cells).

Also provided in the gateway stations 8 is a store 76 storing billing, service and other information relating to those mobile terminals 2 for which the gateway station 8 is the home gateway station. Data is written to the store 76 by the control unit 72 after being received via the signalling unit 74 or switch 70, from the PSTN 10 or the Earth station nodes 6 making up the satellite network.

The satellite system trunk lines 14 comprise, in this embodiment, high quality leased lines meeting acceptable minimum criteria for signal degradation and delay. In this embodiment, all the lines 14 comprise terrestrial links. The trunk lines 14 are preferably dedicated lines, so that the lines 14 form a separate set of physical channels to the networks 10. However, the use of virtual circuits through the networks 10 is not excluded.

Location Database Station 15

Figure 5:
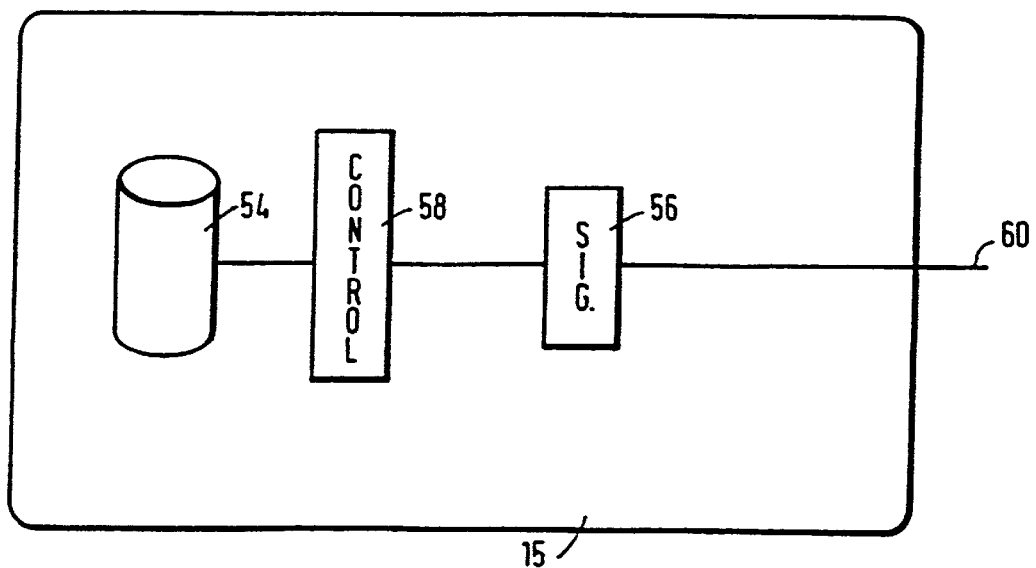
FIG. 5 is a block diagram showing schematically the elements of a database station forming part of the embodiment of FIG. 1.

Referring to FIG. 5 the global database station 15 comprises a digital data store 54, a signalling circuit 56, a processor 58 interconnected with the signalling circuit 56 and the store 54, and a signalling link 60 interconnecting the database station 15 with the gateway stations 8 and Earth stations 6 making up satellite system network, for signalling or data message communications.

The store 54 contains, for every subscriber terminal apparatus 2, a record showing the current status of the terminal 2 (whether it is "local" or "global" as will be disclosed in greater detail below); the geographical position of the mobile terminal 2 (either in co-ordinate geometry, or as code identifying an area within which it lies); the "home" gateway station 8 with which the apparatus is registered (to enable billing and other data to be collected at a single point) and the currently active Earth station node 6 with which the apparatus 2 is in communication via the satellite 4. The contents of the store are indicated in FIG. 6.

The signalling unit 56 and processor are arranged to receive interrogating data messages, via the signalling circuit 60 (which may be a packet switched connection), from gateways 8 or nodes 6, comprising data identifying one of the mobile terminals 2 (for example, the telephone number of the equipment 2), and the processor 58 is arranged to search the store 54 for the status and active earth station node 6 of the terminal 2 and to transmit these in a reply message via the data line 60.

Satellites 4

The satellites 4a, 4b comprise generally conventional communications satellites, and may be as disclosed in our earlier filed UK application GB-A-2288913. Each satellite 4 is arranged to generate an array of beams covering a footprint beneath the satellite, each beam including a number of different frequency channels and time slots, as described in our earlier UK application GE-A-2293725 and illustrated in FIG. 7a.

The satellites 4a are arranged in a constellation in sufficient numbers and suitable orbits to cover a substantial area of the globe (preferably to give global coverage) for example 10 (or more) satellites may be provided in two (or more) mutually orthogonal intermediate circular orbits at an altitude of, for example, 10,500 kilometres as shown in FIG. 7b. Equally, however larger numbers of lower satellites may be used, as disclosed in EP 0365885, or other publications relating to the Iridium system, for example.

Geographical Arrangement

Referring to FIG. 8, one exemplary geographical arrangement is shown (only one satellite 4a is shown for clarity). The database station 15 may be located anywhere, and the position indicated is purely notional in practice, it is preferably located in the geographical area from which most calls originate, or within which the best signalling infrastructure exists. In FIGS. 8 onwards, a dotted line denotes a signalling link and a solid line denotes a communications traffic link.

With the number of satellites mentioned below, there may typically be 12 earth station nodes 6, two for each continents In this manner, each earth station node 6 is connectable to gateways 8 on the continent, whilst having in view one or more satellites 4.

In this embodiment there are significantly larger number of gateways 8 than of earth station nodes 6; on the order of one per country (i.e. over a hundred in total). For larger countries, several gateways 8 may be provided at different geographical locations, or (where several network operators are permitted in the country) one per PSTN. Smaller countries may share gateways 8. Gateways 8 may also be provided from terrestrial cellular networks (although this is not explicitly indicated in FIG. 8).

For ease of explanation PSTNs 10 are omitted from FIG. 8 since their coverage is virtually global.

The operation of the above embodiment will now be described in greater detail.

Registration and Location

In the present embodiment, as mentioned above, a customer mobile terminal apparatus 2 may be registered with one of two distinct statuses; "local" in which the mobile terminal apparatus is permitted only to communicate through one local area, or part of the satellite system network, and "global", which entitles the apparatus to communicate through any part of the satellite system network. Since the latter option places a greater demand on network resources (as will be discussed below), a higher charge may be made for calls for customers registered as "global" or "roaming" users.

The status of each apparatus 2 (i.e. "local" or "global") is stored in the record held for the apparatus 2 concerned in the store 54 of the database station 15, either as a result of a manual input via a keyboard to the store acting on the expressed preference of the owner of the apparatus 2, or (as will be discussed below) in response to a signal from the apparatus 2 requesting a status change.

The mobile terminal apparatus 2 performs an automatic registration process, of the kind well known in the art of cellular terrestrial communications, on each occasion when the terminal 2 is utilised for an outgoing call; and/or when the apparatus 2 is switched on; and/or periodically whilst the apparatus 2 is switched on. As is conventional, the registration process takes the form of the broadcasting of a signal identifying the mobile terminal 2 (e.g. by transmitting its telephone number on a common hailing or signalling frequency).

The transmitted signal is picked up by one or more satellites 4. Under normal circumstances, the signal is picked up by multiple satellites 4, and the received signal strength and/or time of arrival are transmitted, together with the identity of the mobile apparatus 2 and of the satellite 4 receiving the signal, to the database station 15 via the earth stations node or nodes 6 for which the satellites 4 are in communications, and the signalling line 60.

The processor 58 of the database station 15 then calculates, e.g. on the basis of the differential arrival times, the terrestrial position of the mobile terminal apparatus 2, which is stored in the database 54. Also stored is the identity of the earth station node 6 most suitable for communicating with the mobile terminal apparatus 2 (the "active" station). This is typically found by the processor 58 comparing the stored position of the terminal 2 with the predetermined stored positions of each of the earth station nodes 6 and selecting the nearest. However, account may also or instead be taken of the strength of the signals received via the satellites 4, or of other factors (such as network congestion) to result, in borderline cases, in the choice of a node earth station which is not geographically closest to the mobile terminal equipment 2. The identity of the allocated active earth station node 6 is then likewise stored in the store 54 in the record for that terminal apparatus.

LOCAL STATUS

The stored status of the mobile terminal equipment 2 is read by the processor 58. If the status is "local", the stored position of the mobile terminal apparatus is compared with the local range permitted to the user (for example, the national boundaries of a country or a PSTN 10). In a simple example according to this embodiment, the local area is a geographical area covered by a PSTN 10 connected to the home gateway station of the mobile terminal 2.

If the position of the terminal equipment 2 lies outside the local area within which it is permitted to communicate, an "out-of area" flag is set in the record in the store 54 relating to the user. A message is transmitted by the processor 58 (via the signalling circuit 56 and signalling line 60) to the active earth station node 6 to which the mobile terminal apparatus 2 has been allocated, comprising the identity of the mobile terminal unit 2, together with its geographical position, an indication that it is registered as a local user, an indication of its "home" gateway, and a flag indicating that it is unavailable as being out of its area. This data is stored in a record created for the mobile terminal equipments in the store 48 within the earth station node 6.

The active earth station node 6 will take no further action to connect either incoming or outgoing calls with the mobile apparatus 2. It may send an "out of area" message via the satellite 4 to the mobile apparatus 2, comprising the identification code for the mobile and an "out of area" code, in response to which the mobile terminal apparatus 2 may display a message on the display 39, or otherwise indicate the "out of area" status to a user (for example, by generating a audio tone through the loudspeaker 34 or illuminating an indicator lamp).

In the event that the processor 58 determines that the mobile terminal equipment 2 is registered as "local" and is within its permitted local area, a message is transmitted to the active allocated earth station node 6 indicating the same details of identity, position and local status, but setting an "available" flag rather than an "out of area" flag as previously. In this instance, the earth station node 6 will in future treat the mobile terminal apparatus 2 as being available for communications, by allocating a communications channel and satellite to the apparatus on initiation of either an incoming or an outgoing call.

GLOBAL STATUS

If the processor 58 identifies, from the record in the store 54, that the status of the registering mobile terminal apparatus is "global", it transmits, via the signalling circuit and signalling line 60, a message (which, as above, contains the terminal identification number, status ("global"), position, and home gateway identification for the mobile terminal apparatus 2) to the allocated active earth station node 6, which creates or updates a record in its store 48.

Thus, as a result of the registration process described, a central record for every mobile terminal apparatus 2 is maintained in the store 54 of the database station 15 accessible by nodes 6 and gateways 8; and each node 6 maintains in its store 48 a local record of every mobile communications apparatus 2 within its area, together with its position and home gateway, and available or unavailable status.

It would also be possible for the stores 48 of each node 6 to store only data relating to global status and local—in—area status apparatus, and not store data relating to local status mobile terminal 2 which are out of their own area.

The store 54 acts somewhat in the manner of the Home Location Register (HLR) of a GSM terrestrial cellular system, and the store 48 in the manner of the Visiting Location Register (VLR) of GSM; commercially available HLR and/or VLR equipment may therefore be employed for these components, modified as necessary.

CHANGE OF STATUS

The operator of a given mobile terminal apparatus 2 may change the status thereof between "local" and "global" or vice versa, either by communicating with the operator of the satellite system network and thereby causing a manual data entry into the contents of the store 54, or by initiating a sequence of key strokes on the key pad 38, or otherwise, inputting a signal to the mobile terminal apparatus 2.

In the former case, the change of status is signalled by the processor 58 to the allocated active node 6, which updates the record within its store 48, and in the later case the sequence of key strokes received from the mobile terminal equipment 2 is relayed via the satellite 4 to the active node 6, which transmits the change of status as a signal to the database station 15, at which the processor 58 updates the record stored in the store 54 and signals back for the active node 6 to do likewise within its store 48. It is preferred that handshaking techniques of this type be employed, to ensure that the records stored in the central store 54 and stores 48 in node stations 6 be kept in agreement.

Although it is not germane to the present invention, it will be apparent that the stores 54 or 48 may store other information pertaining to the customer or apparatus 2, and that all information stored in the store may be updated by manual entry or signalling from other sources (for example, position location apparatus within mobile terminal equipment 2 where available, using e.g. the Global Positioning System (GPS)). Any change in information stored in relation to the customer or the equipment 2 is relayed to the central database station 15 in the form of a message via the signalling link 60, and is distributed therefrom to the active node 6.

In particular, further information is held at the "home" gateway 8, comprising at least billing records for usage of the satellite system network by the mobile terminal apparatus 2.

CALL SET UP AND ROUTING

The processes of routing calls to and from mobile terminal apparatus 2 in the present invention will now be described. By way of example, calls to and from fixed stations 12 available through PSTN networks are described, but it will be immediately apparent that the same principles are applicable to communication to and from terrestrial mobile terminals available through public land mobile networks (PLMNs).

1. LOCAL USER—LOCAL CALL

A. Fixed to Mobile Calls

Figure 9:
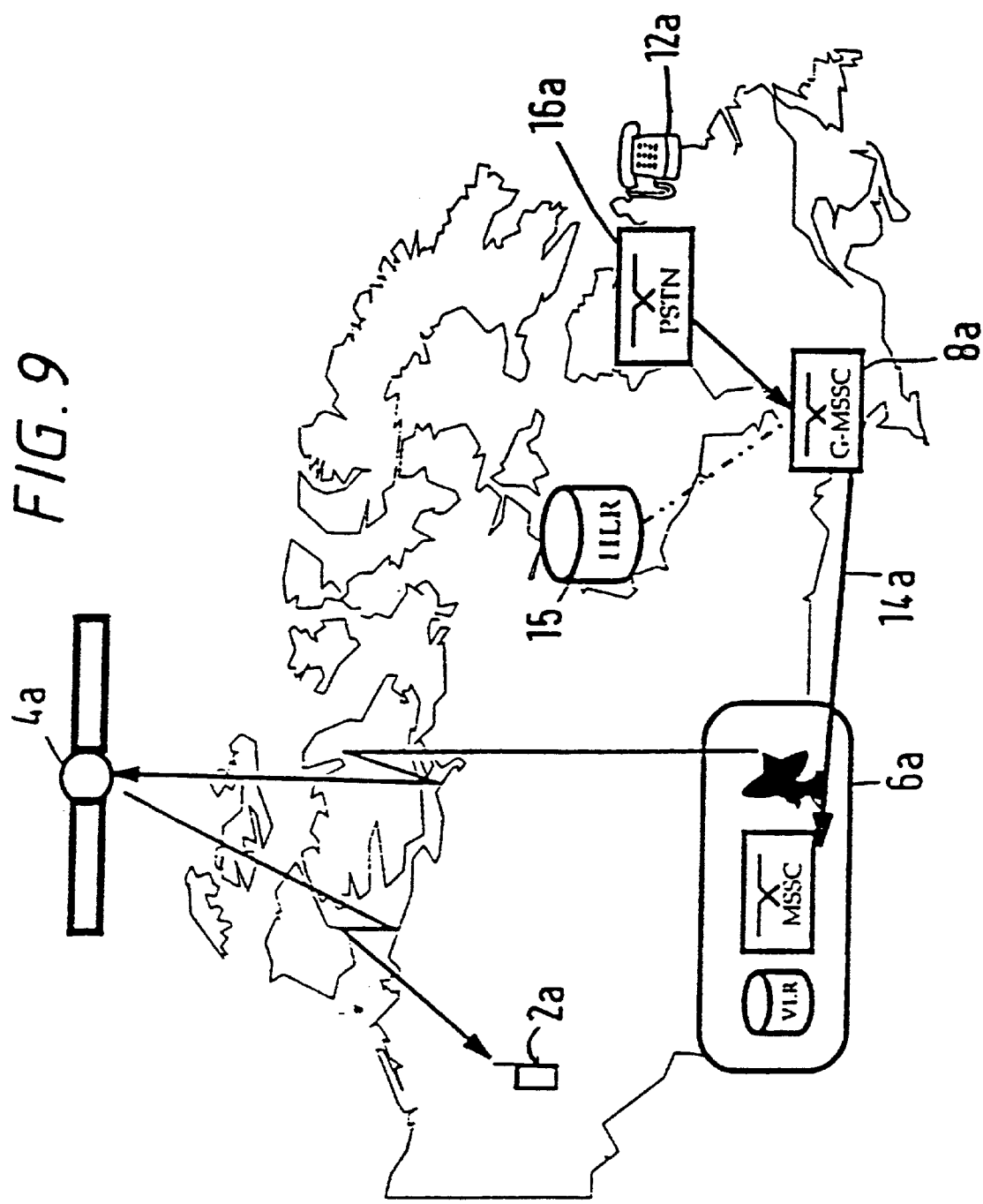
FIG. 9 corresponds to a part of FIG. 8 and shows the path taken by an incoming call to a locally registered mobile terminal.

First, the case where the mobile terminal equipment 2 is registered as a "local" user will be considered with reference to FIG. 9.

The terminal apparatus 2a, being registered as "local" to the nearest gateway 8a, has a dial number which is recognised by the PSTN 10a to which the gateway 8a is connected as relating to the satellite service network.

The fixed terminal 12a dials through the local PSTN node 16a, and the call is routed via the PSTN 10a to the local gateway 8a. The gateway 8a sends an interrogation message to the database station 15, comprising the dial number of the mobile terminal equipment 2a. The database station 15 transmits back, in reply, the information that the terminal equipment 2a is registered as local and is available (i. e. is currently in the local area of the gateway 8a), and, in this embodiment, the identification of the node 6a via which the mobile terminal equipment 2a is contactable.

The gateway 8a sets up a connection, via ground network line 14a, to the ground station node 6a, passing on the dial of the mobile terminal equipment 2a to be called. The station node 6a switches the call into the appropriate multiplexed time frequency channel within the up link broadcast to the satellite 4a (and, preferably, at least one further satellite 4b, as disclosed in our earlier application GB-A-2293725.

The satellite 4a demultiplexes the up link signal and routes the call to a time/frequency slot on one of its beams, via which it is broadcast to the mobile terminal equipment 2a. A corresponding return link from the mobile station 2a is set up, and the channel is held open during the duration of the call. The earth station node 6a then transmits billing information to the local (home) gateway 8a, for subsequent billing of the mobile terminal 2a.

B Mobile to Fixed Call

Figure 10:
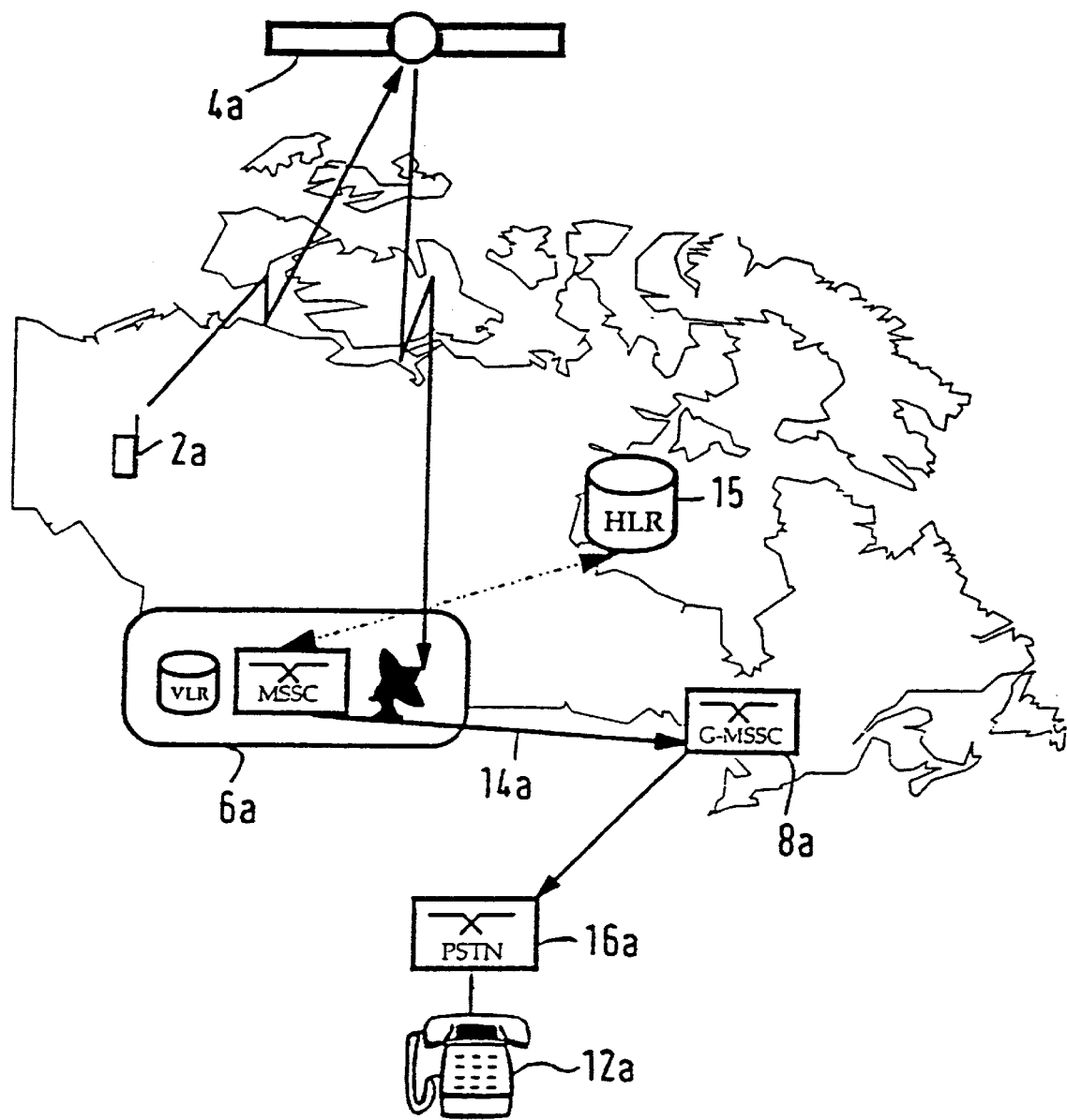
FIG. 10 corresponds to FIG. 9 and shows the corresponding path taken by an outgoing call from the mobile terminal.

When a locally registered mobile terminal 2a, which is within its permitted area, wishes to initiate an outgoing call to a fixed station 12b, as shown in FIG. 10 the terminal 2a transmits a message to the ground station node 6a via the satellite 4a in including the dial number of the fixed terminal 12a.

The earth station node 6a transmits an interrogation message to the database station 15, to determine the home gateway 8a with which the mobile terminal equipment 2a is registered, and sets up a call to the home gateway 8a via the ground network line 14a, through which the dial number of the fixed terminal 12a is transmitted. The gateway 8a passes the dial number to the local PSTN 10a to which it is connected, and the call is thereby set up.

The circuit through the line 14 and PSTN 10a is maintained during the duration of the call. After completion of the call, the earth station node 6a transmits billing information to the home gateway 8a as above.

2. LOCAL USER—INTERNATIONAL CALL

A Fixed to Mobile Call

Figure 11:
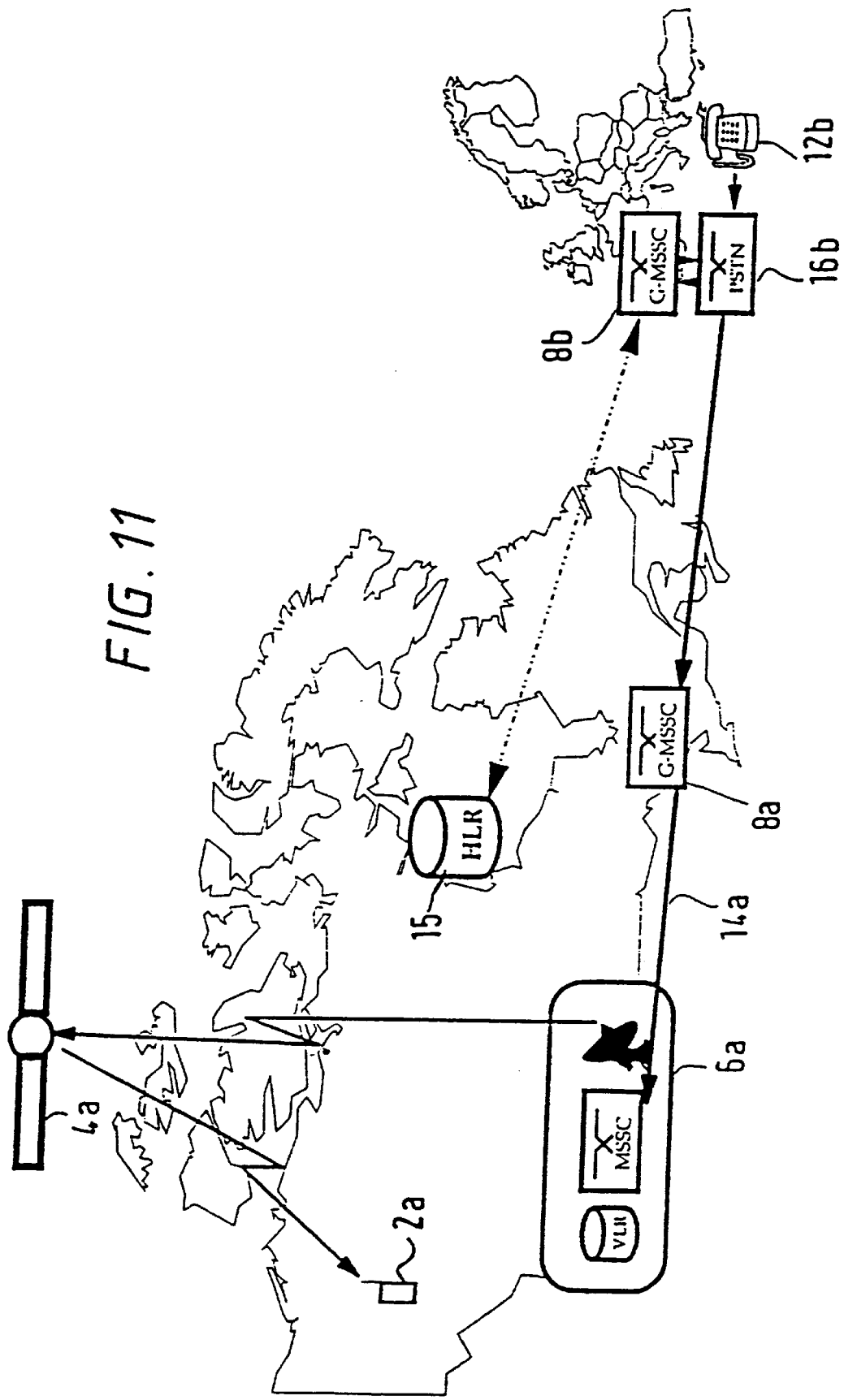
FIG. 11 corresponds to FIG. 9 and shows the path taken by an international incoming call to a locally registered mobile terminal.

Referring to FIG. 11, a fixed terminal 12b in a different country dials, as before, the dial number of a mobile terminal 2a. The local exchange 16b and PSTN lob recognise the prefix as being a call to the international satellite network and route the call to the local gateway station 8b connected to the PSTN lob.

The gateway 8b transmits an interrogation signal to the database station 15 including the dial number of the called mobile terminal 2a. In reply, the database station 15 returns the information that the mobile terminal 2a is registered as a local terminal, and supplies the dial number of the home gateway 8a of the mobile terminal 2a.

The gateway 8b holds open the connection from the PSTN 10a, and sets up a return connection to the PSTN 10a through which the dial number of the home gateway 8a is supplied. The dial number is recognised as an international call by the PSTN 10b and is routed, via international switching centres 20b, 20a and transnational link 21, to the home gateway 8a, which sets up a connection, via dedicated line 14a, to the earth station node 6a to which it is connected and, as before, the call is connected to the mobile terminal 2a via the satellite 4.

Thus, in this embodiment, when a call from a local user originates from a different area (for example a different country), the call is initially directed to the local satellite system gateway 8a, which then determines the home gateway of the mobile user and directs the call on through the international public switched telephone network (PSTN).

B Mobile to Fixed Call

The process here is identical to that described in relation to FIG. 10, since the dial number supplied to the home gateway 8a contains the international dialling prefix necessary to set up the call to the remote PSTN 10b and called terminal 12b; the first PSTN 10a to which the gateway is connected will dial through as appropriate in accordance with the dial number supplied by the mobile terminal 2a.

3. OUT OF AREA LOCAL USER

As described above, if a locally registered terminal 2 is out of its area it will receive no service. In the event of an incoming call, as described in relation to FIGS. 9 or 11, when the database station 15 is interrogated, the reply signal will indicate that the status of the terminal equipment 2 is unavailable, and the call will be terminated without it having been necessary to set up an international call. When the mobile terminal 2 attempts to initiate an outgoing call, it will be unsuccessful.

4. GLOBAL USER

A Fixed to Mobile Call

Figure 12:
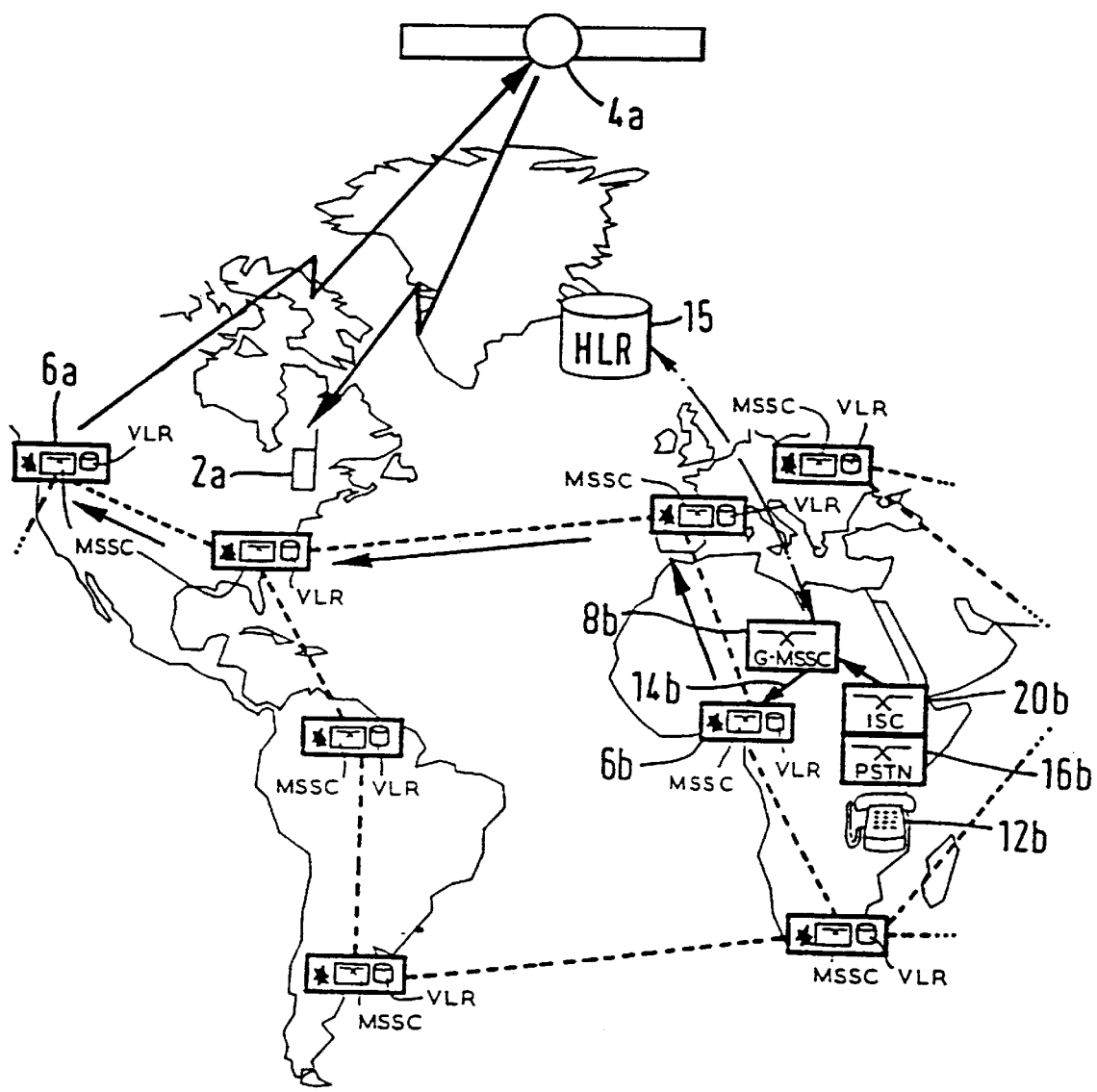
FIG. 12 corresponds to a part of FIG. 8 and shows the path taken by an incoming call to a globally registered mobile terminal.

Referring to FIG. 12, the initial steps in this process are as in the preceding cases. The fixed terminal 12b dials the dial number of the mobile terminal 2a. The local PSTN 10b recognises it as pertaining to the satellite service network and routes the call to the local gateway 8b. For example, the call number of the mobile terminal 2a may be prefixed by an international dialling code, such that the call is routed through the PSTN 10b to the international switch centre 20b thereof, from whence it is routed to the gateway 8b.

At the gateway 8b, the gateway station transmits an interrogation message to the database station 15 including the call number or identification of the called mobile terminal 2a. The database station 15 replies with a message which specifies the global status of the mobile terminal 2a, and comprises an identification of the earth station node 6a via which the mobile terminal 2a may be contacted.

The gateway 8b then sets up a connection via dedicated line 14b to the active earth station node 6a, via its local node station 6b, through the dedicated ground network lines 14. The active node station 6a then sets up the link to the mobile terminal equipment 2a via the satellite 4a as discussed above.

After completion of the call, the active earth station unit transmits billing data to the home gateway for the mobile user 2a.

Thus, it will be seen that in this embodiment, in routing a call to a global rather than a local user, the gateway 8 at which the call first arrives is arranged to route the call to the active earth station node via the dedicated ground network lines 14, rather than via the PSTN as for a local user.

In this case, the home gateway of the mobile terminal equipment 2a plays no part in the routing process; this is technically desirable, since the home gateway might be at a point on the planet distant from either the calling terminal 12b or the active earth station node 6a. Instead, the route from the calling gateway 8b (which is generally geographical close to the calling terminal 12b) to the active earth station node 6a via the dedicated ground network lines 14 is chosen to be relatively direct, and to utilise dedicated lines 14 of a quality which will not, when in combination with the satellite link via the satellite 4, render the link unacceptable to a user.

B Mobile to Fixed Call

Figure 13:
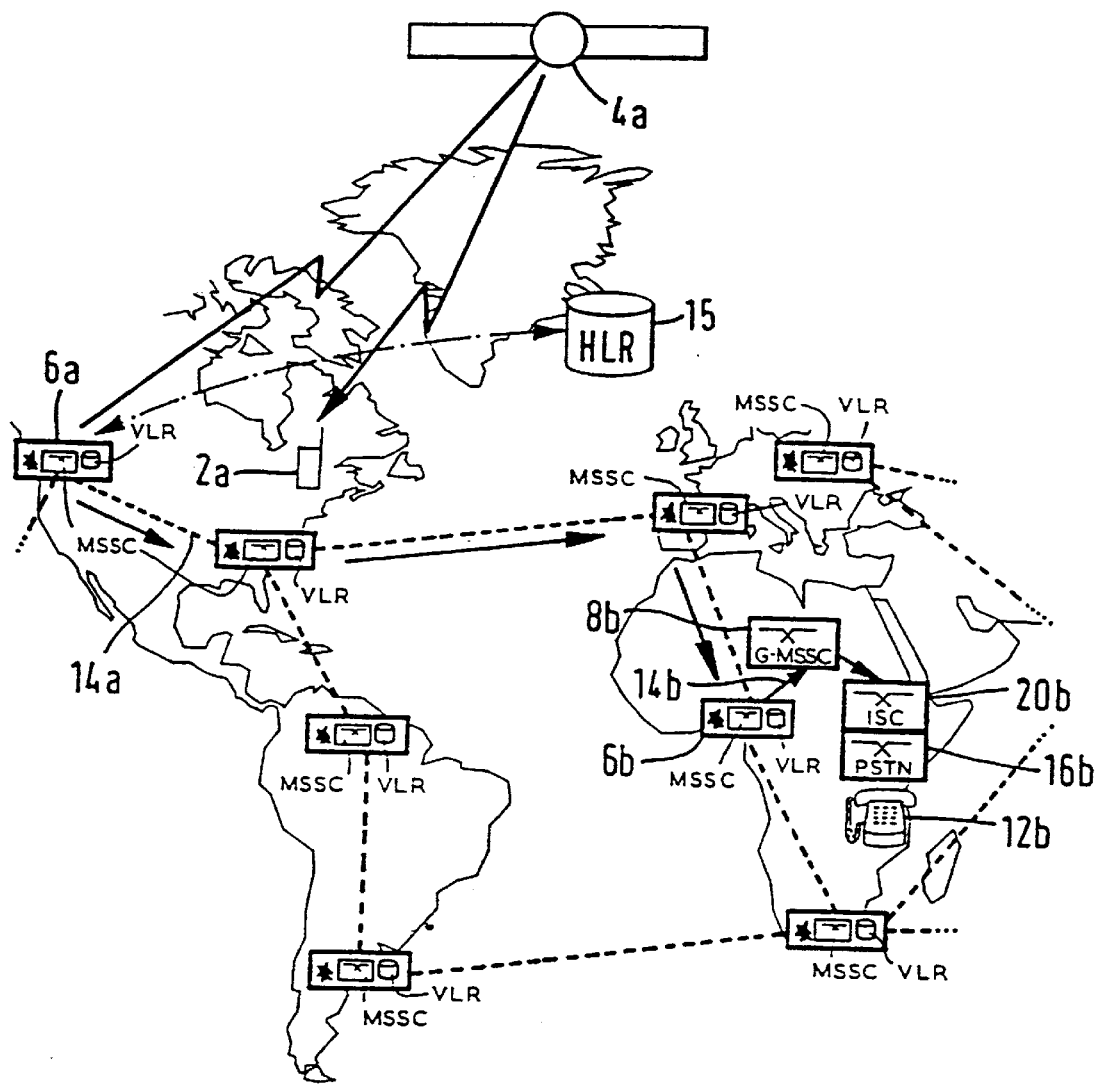
FIG. 13 corresponds to FIG. 12 and shows the corresponding path of an outgoing call from the mobile terminal.

Referring to FIG. 13, when a mobile terminal 2a attempts to originate an outgoing call to a fixed terminal 12b, it initiates a call via the satellite 4a to the earth station node 6a, commencing by signalling the dial number of the fixed terminal 12b (including country code).

The earth station node 6a determines, from the country code dialled, the gateway 8b which is connected to (or is closest to) the PSTN 10b to which the fixed terminal 12b is connected, and sets up a circuit through the dedicated lines 14 forming the ground network to that gateway 8b via the earth station node 6b to which it is connected.

The target gateway 8b passes the remainder (excluding country code) of the dialled call number of the fixed terminal 12b to the PSTN 10b via the international switch centre 20b thereof and the call is routed to the fixed terminal 12b, the circuit being held open for the duration of the call.

On termination of the call, the active node 6a transmits billing data to the home gateway of the mobile terminal apparatus 2a as before.

Thus, it will be seen that in this case also, the call proceeds via the dedicated ground network 14 rather than via the international PSTN lines 21 (as was the case for the local registered user above), enabling a better and relatively direct connection which does not involve the home gateway of the mobile terminal 2a (which could be located distant from the mobile terminal or the fixed terminal).

MOBILE-TO-MOBILE CALLS

A mobile-to-mobile calls is executed simply as a mobile-to-fixed call (described above), followed by a fixed-to-mobile call (as described above). Thus, a call between two global users is routed entirely over the ground network between the calling and called active earth station nodes, as are calls from a global to a local mobile and vice-versa. A call from one local user to another, on the other hand, is routed predominantly through the PSTN.

LOCAL CALL NUMBERING

In the above-described embodiments the dial numbers allocated to mobile users have 'international' prefixes followed by a code which does not correspond to any national PSTN but does correspond to the satellite service network.

It is equally possible, however, to provide an embodiment in which such numbers do have a prefix code which corresponds to a particular PSTN or PLMN. In this embodiment, the description is modified in the following respects. The local gateways 8a etc. are connected to a local exchange of the PSTN. When a fixed user dials a mobile user, the call is routed through the PSTN, either to the local exchange (if within the same PSTN as the fixed user) or through the ISC of the PSTN, via an international circuit, to a distant PSTN within which the local exchange is located.

At the local exchange, the dial number is recognised as belonging to the satellite mobile system and a call is set up to the local gateway 8a. From this point on, the process is as described above, the call being selectively routed either via the dedicated ground network or the PSTN (or PLMN or other network).

ACTIVE GATEWAY SELECTION

In the above described embodiments, the database station 15 stores an indication of the active earth station node 6 for each mobile user apparatus 2, based on a registration process which may be performed on initiation of a call, on logging on, or repeatedly during a call.

In a further embodiment, the processor 58 of the database station 15 is arranged to select the active earth station node 6 on initiating of an incoming or outgoing call to the mobile user apparatus 2.

Figure 14:
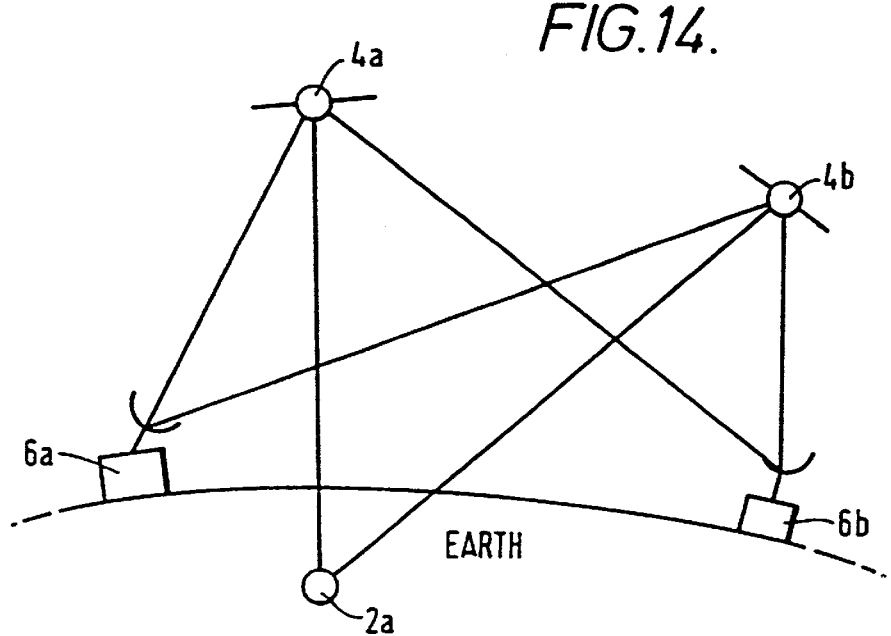
FIG. 14 illustrates schematically four possible paths between a mobile station, two satellites and two earth stations.

Referring to FIG. 14, a mobile user apparatus 2a is positioned on the earth surface, and two satellites 4a, 4b are at a relatively high elevation angle with respect to the apparatus 2a. Each of the satellites 4a, 4b is also, as shown, at a relatively high elevation angle with regard to each of two earth stations 6a, 6b.

The apparatus 2a can therefore be interconnected with another communications system via one of the following routes:

2a-4a-6a;
2a-4a-6b;
2a-4b-6a;
2a-4b-6b.

In general, the signal quality via each of these links will be different. In the example of FIG. 14, the best link quality may be obtained on the shortest uplink and downlink path, which is 2a-4a-6a, and the worst may be obtained on the longest signal path which is 2a-4b-6a. The shortest path will have the shortest transmission time delay. Also, since it will involve the highest elevation angles, it will be the least subject to attenuation by the atmosphere and terrain, and to multipath effects.

Because of the relatively lower power or quality of the transmission and reception equipment available on the mobile user apparatus 2a relative to the satellite 4a and the earth station 6a, the signal quality may depend predominantly on the link between the mobile apparatus 2a and the satellite 4a. Preferably, as disclosed in our earlier application GB-A-2293725, communication is effected via a plurality of these links simultaneously.

Since the satellites 4 are travelling in known orbits and the positions of the earth stations 6 are predetermined, the processor 58 is capable of calculating what the shortest mobile-satellite link and the shortest mobile-satellite-earth station link will be, for any given mobile user equipment position at any time of day.

Typically, several of the possible link paths between a mobile equipment 2 and an earth station 6 may all be of acceptable quality. In this case, further factors may determine the selection of the active earth station. Firstly, the mobile terminal 2 may be registered as a "local" user and may be entitled only to use one of the earth stations 6. In this case, this earth station is selected even if the link to this earth station would not be of such high quality as the link to another earth station 6.

Furthermore, because of the motion of the satellites 4 (where they are in non-geostationary orbits) the preferred link may not be the link path which is the shortest at the moment a call is initiated, because the satellite in question may move away. Accordingly, this may lead to the selection of an Earth station which is arranged to communicate via a different satellite which will be in view for a longer period with a corresponding lower link quality, over a receding satellite albeit having a higher link quality.

In the case of a mobile-to-mobile call, where a first mobile terminal apparatus is communicating via a first earth station 6, and that earth station 6 is one of several earth stations via which links can be established to the called mobile terminal apparatus 2a, it may be preferred to select the first earth station so as to avoid the necessity to route the call through either the ground network or the terrestrial PSTN.

Finally, where other factors are equal, the selection of an active earth station 6 amongst several possible active earth stations may be made in dependence upon the relative traffic carried by the two stations, so as to distribute traffic evenly between earth stations.

Figure 15:
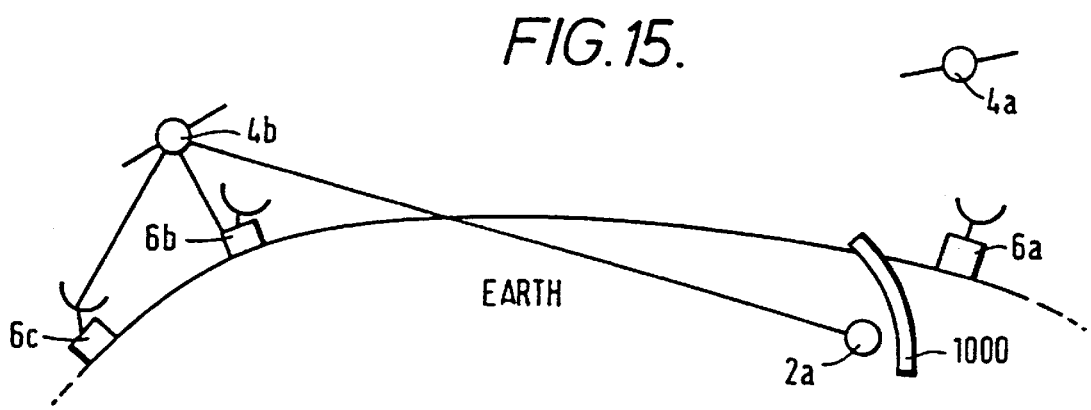
FIG. 15 corresponds to FIG. 14 with the addition of a shadowing obstacle.

Referring to FIG. 15, a mobile terminal apparatus 2a may be positioned on the earth surface adjacent to some shadowing structure 1000 such as, for example, mountainous terrain or a tall building. Under these circumstances, the path from the mobile terminal 2a to the closest satellite 4a and earth station 6a may be blocked.

However, as indicated, there may be a line of sight to a more distant satellite 4b at a lower elevation angle. The distant satellite 4b may be capable of communicating with the ground station 6a which is nearest to the mobile terminal 2a, but the path from the satellite 4b to the nearest earth station 6a may be long, and accordingly it is preferable for the satellite 4b to communicate via an earth station 6b or 6c which is more distant from the mobile terminal 2a. Even of the two distant earth stations 6b or 6c, the link quality to the earth station 6c which is further from the mobile terminal apparatus 2a may be better than that to the nearer earth station 6b.

Accordingly, in this embodiment, rather than merely relying upon either the closest earth station 6 to the mobile terminal equipment 2 or the earth station 6 which is calculated, from the satellite ephemerides, to have the best link quality, a test is additionally made of link quality via each of a plurality of earth stations before the active earth station is selected.

CALL TO MOBILE

Figure 16A:
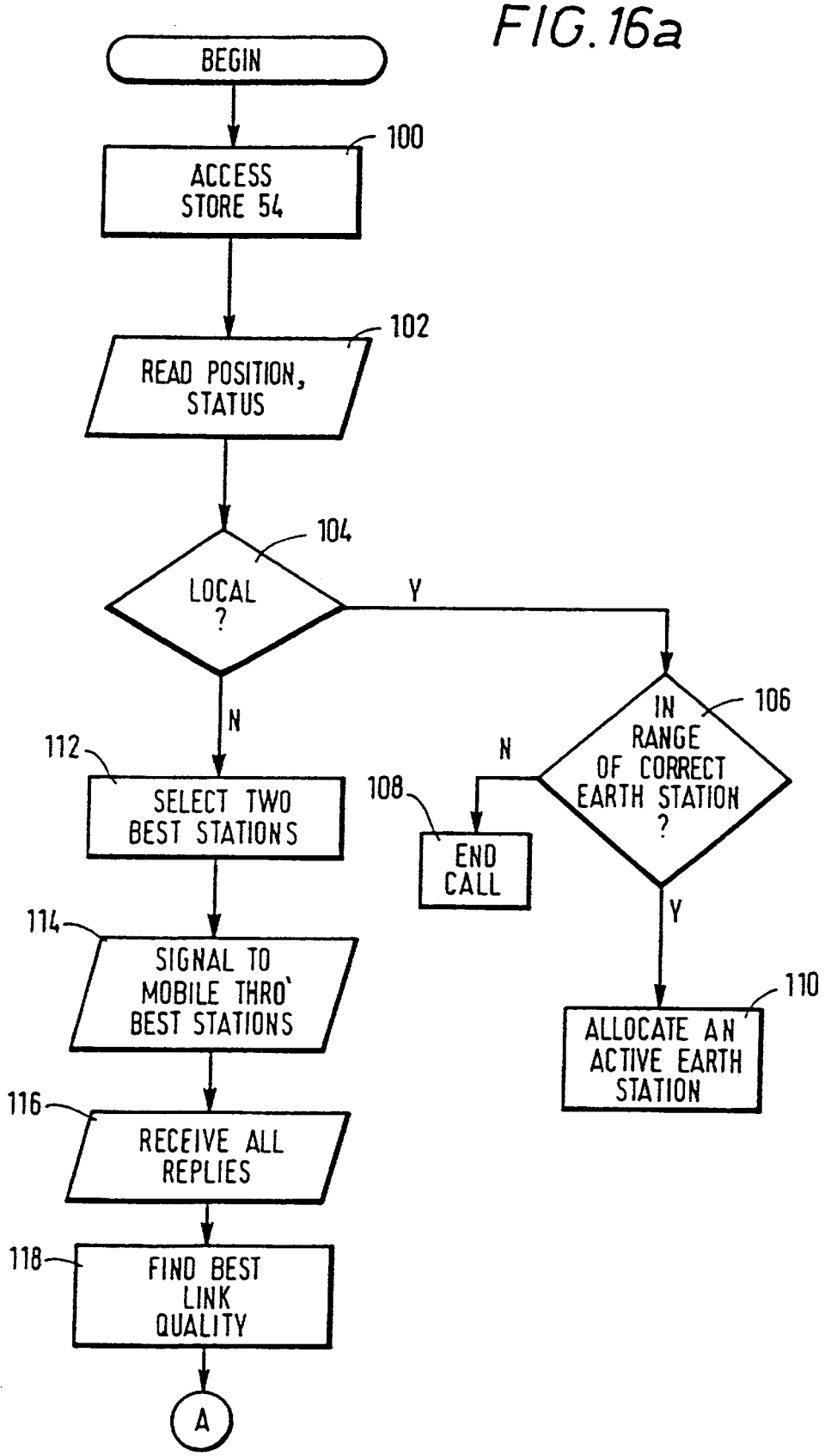
FIG. 16, consisting of FIGS. 16a and 16b, is a flow diagram illustrating the process of allocation of an active earth station for a call to a mobile user.

Referring to FIG. 16, the process performed by the processor 58 of the database station 15 in response to a call, to a mobile user apparatus will now be described. In a step 100, the processor 58 accesses the store 54 and, in a step 102, reads the mobile position and status data for the called mobile user apparatus from the store 54.

In a step 104, the control circuit 58 tests whether the status is 'local' and, if so, in a step 106 the processor 58 calculates, using the mobile position and stored satellite ephemeris data, whether the mobile user apparatus 2 is positioned to be able to communicate with a permitted earth station (i.e. one associated with the geographical area or part of the satellite communication system within which the local user is permitted to travel).

If not, the call is terminated in step 108 by, for example, signalling that the user is unobtainable (out of area). If the user is able to communicate with a permitted earth station (for example one connected directly to a PSTN with which the user is registered), then this earth stations is allocated as the active earth station in a step 110.

If the status of the user is determined to be 'global', rather than 'local', in the step 104, in a step 112 the processor 58 calculates the expected signal quality (signal strength and delay time) on each of the mobile terminal-satellite-earth station links which are possible, using the mobile terminal position and satellite ephemeris data, and selects the two best earth stations in a step 112.

Next, in a step 114, the database station sends a hailing signal via the signalling link 60 to the two best earth stations calculated in the step 112, and thence via a common signalling broadcast channel, via the satellites with which each earth station is in communication, to the mobile user equipment 2.

If the mobile user equipment 2 is switched on, it broadcasts in response a reply signal on a common hailing frequency. The reply signal is returned, via all satellites 4 in range of the mobile terminal equipment, to all earth stations 6 with which the satellites are in communication. At the earth stations 6, the quality of the mobile-satellite-earth station link is measured, to assess signal quality utilising for example the bit error rate, the frequency error and so on.

Each earth station then signals a measure of the received quality back, via the signalling link 60, to the processor 58 at the database station 15, which receives the reply signals in a step 116.

In a step 118, the measured link qualities are assessed, and the best three links are retained in a step 118, if they exceed minimum link quality criteria. In a step 120, the control circuit 58 determines whether the earth station (in the case of a call from another mobile user terminal apparatus), or nearest earth station to the gateway (in the case of a terrestrial originating call), from which the call came is one of the selected earth stations. In the event that it is, it is allocated as the active earth station in step 122.

This measure minimises the use which is made of the dedicated ground network, by providing that wherever call quality is acceptable, only one earth station is involved in handling the call.

In the event that the originating earth station (i.e. either the earth station which receives the call in the case of a user originated call, or the earth station to which the originating gateway, is connected in the case of the terrestrial originating call) is not selected in steps 120 and 122, then in a step 124 the control circuit 58 interrogates each of the selected earth stations in turn and receives a signal indicating a current loading (call traffic volume) of the earth stations, in a step 124. Any earth station which is too busy to process the call may not be selected as the active earth station (and if all earth stations are busy, a signal indicating this is transmitted to the calling party).

If, following step 126, one or more earth stations is not busy then in step 132 the earth station via which the highest quality link is achievable is selected and allocated, in step 134, as the active earth station.

Following allocation of an earth station in steps 110, 122 or 134, the address of the active earth station is signalled back to the originating gateway or earth station as in the above described embodiments to allow the call to be set up.

In the above process, as part of the link quality calculation step 112, it is possible also to take account of the nature of terrestrial links between the originating gateway or earth station and each possible active earth stations, so as to avoid the selection of an active earth station which is only accessible via a satellite link, for example.

OUTGOING MOBILE TO FIXED CALL

When a mobile user apparatus 2 is operated to initiate a call, it generates a hailing signal on a hailing channel, which is intercepted by one or more satellites 4. Each satellite relays the hailing signal to the earth stations 6 to which it is in contact, which in turn measure the received signal quality and forward the signal, together with signals indicating the received quality, to the database station 15.

Figure 17A:
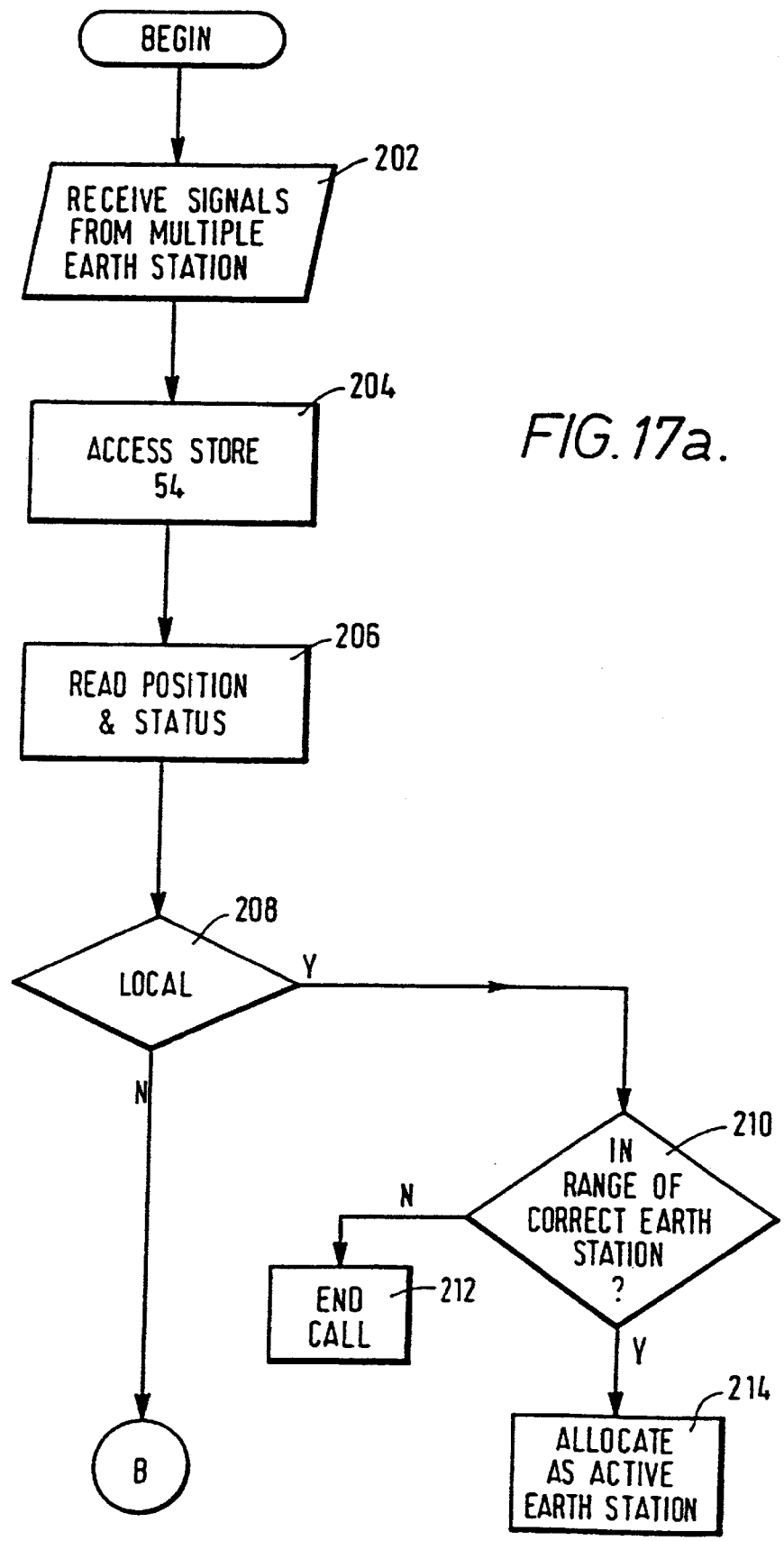
FIG. 17, consisting of FIG. 17a and 17b, is a flow diagram illustrating the process of allocation of an active earth station for a call directed to a mobile user.
Figure 17B:
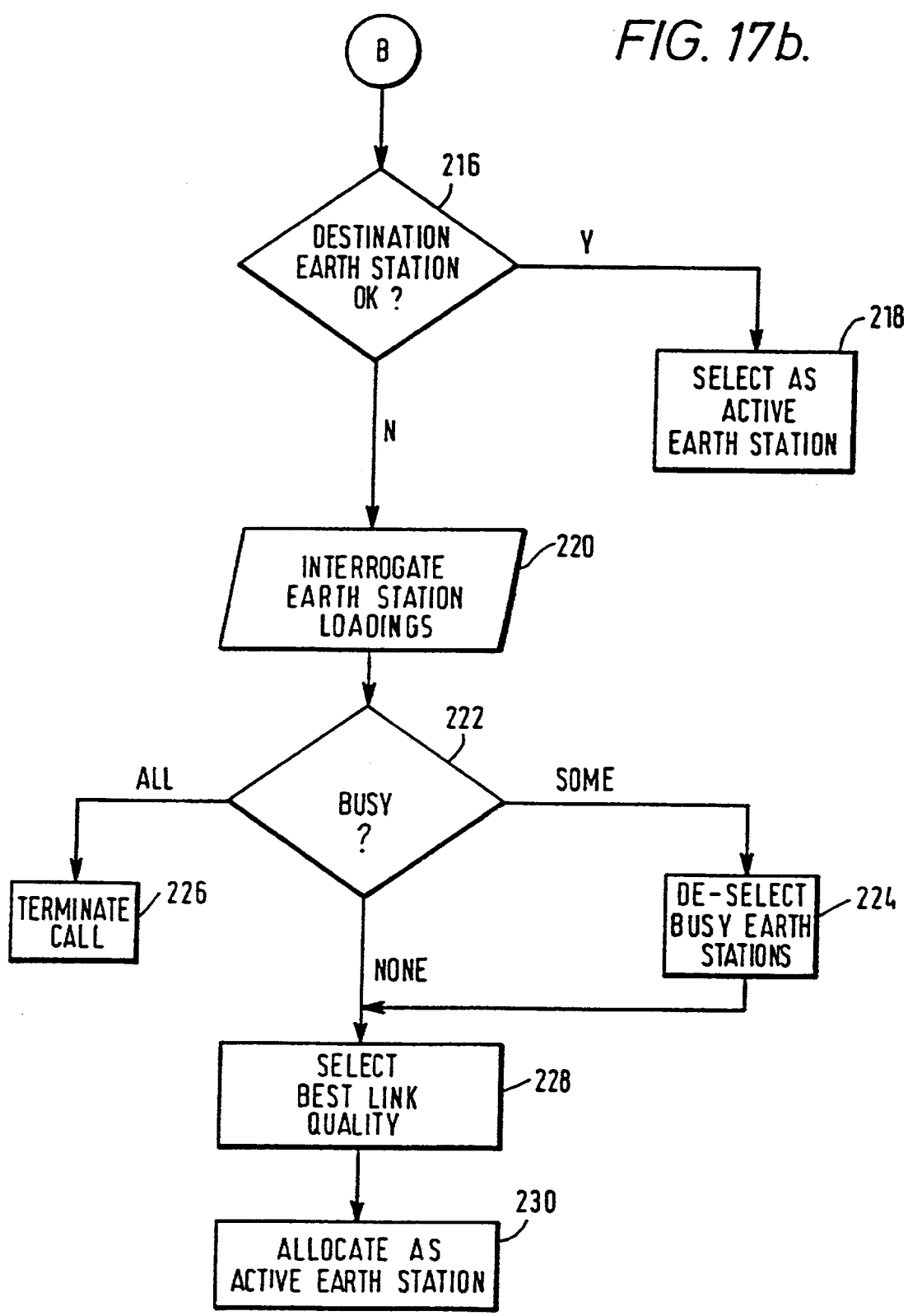

Referring to FIG. 17, in a step 202, the control unit 58 at the database station 15 receives the hailing and quality signals from each of the earth stations 6 and, in a step 204, accesses the store 54 in a step 204 and reads the mobile position and status in a step 206. The mobile position may be updated based on the signals received from the earth stations 6.

In a step 208, the status of the mobile is tested and, if the status is 'local', in a step 210 the processor calculates (using the mobile user apparatus position data and satellite ephemeris data) whether the apparatus would have a predicted good quality link to the earth station assigned to its geographical area, and measures whether the actual link quality for that earth station is satisfactory.

If one or both of these conditions is not satisfied, the call is terminated in a step 212. If both conditions are satisfied, this earth station is assigned as the active earth station in a step 214.

If the status of the user apparatus is determined to be global in the step 208, the control circuit 58 determines, in a step 216, whether the destination earth station (that is, the earth station via which the call would be routed through the ground network to reach the gateway of the PSTN of the called number, or the gateway which is allocated or is to be allocated as the active gateway for a called mobile user apparatus 2) is a gateway station from which a good link quality signal has been received, and furthermore is a gateway station for which, based on the mobile position data and the satellite ephemeris data, a good predicted link quality is calculated.

If both these criteria are met, in a step 218 the destination earth station is allocated as the active earth station. If one or both of these criteria is not met, in a step 220, the processor 58 interrogates those earth stations from which signals were received (as in step 124 above) to determine their state of busyness and, in step 222, determines which, if any, are busy (i.e. heavily loaded with call traffic).

In step 224, any earth stations which are already heavily loaded are dropped from further consideration. If all are fully loaded with traffic in step 226, the call is terminated. If one or more earth stations has capacity, then in step 228 the control circuit 58 selects the earth station which has the highest measured link quality.

Account may also be taken of the predicted future quality of the link calculated from the mobile user terminal position data and the satellite ephemeris data where several earth stations exhibit an acceptable measured link quality.

The earth station exhibiting the best link quality is allocated as the active earth station in step 134.

It will be clear from the foregoing that, in this embodiment, various techniques which have been described in combination may be used separately of each other to achieve some advantages. For example, use may be made exclusively of measured link quality ignoring satellite ephemerides, or may be made exclusively of a calculation of predicted link quality based on user terminal position data and satellite ephemeris data, ignoring measured link quality.

Whilst it is convenient to allocate capacity according to the state of busyness of the earth stations, it is not essential to do so, and/or other methods of doing so may be employed.

The feature of preferentially employing the source (for an incoming call) or destination (for an outgoing call) earth station as the active earth station to serve the mobile user equipment (where this gives an acceptable link quality) is advantageous, but not essential.

Any or all of the above improvements may be used without the feature of local and global categories of users described in the foregoing embodiments.

OTHER EMBODIMENTS

It will be clear from the foregoing that the above described embodiment is merely one way of putting the invention into effect. Many other alternatives will be apparent to the skilled person and are within the scope of the present invention.

For example, the numbers of satellites and satellite orbits indicated are purely exemplary. Smaller numbers of geostationary satellites, or satellites in higher altitude orbits, could be used; or larger numbers of low earth orbit (LEO) satellites could be used. Equally, different numbers of satellites in intermediate orbits could be used.

Although TDMA has been mentioned as suitable access protocol, the present invention is fully applicable to other access protocols, such as code division multiple access (CDMA) or frequency division multiple access (FDMA).

Equally, whilst the principles of the present invention are envisaged above as being applied to satellite communication systems, the possibility of the extension of the invention to other communications systems is not excluded.

Although, for the sake of convenience, the term "mobile" has been used in the foregoing description to denote the terminals 2, it should be understood that this term is not restricted to handheld or hand-portable terminals, but includes, for example, terminals to be mounted on marine vessels or aircraft, or in terrestrial vehicles. Equally, it is possible to practice the invention with some of the terminals 2 being completely immobile.

Instead of providing a single central database station 15 storing details of all terminal equipment 2, similar details could be stored at the home gateway 8 for all terminal equipment to register with that home gateway 8.

To reduce traffic volumes on the ground network, it would be possible to put the low bit-rate codecs at the gateways 8, so that all traffic within the satellite system is encoded, being coded on entry into and decoded on exit from the system.

In the transmission of billing data, the billing data may either be actual cost or charge data, or duration data.

In the foregoing, the gateways 8 may in fact be comprised within an ISC or exchange or mobile switching centre (MSC) by providing additional operating control programmes performing the function of the gateway.

In the foregoing, dedicated ground networks lines have been described, and are preferred. However, use of PSTN or PLMN links is not excluded where, for example, leased lines are unavailable or Where temporary additional capacity is required to cope with traffic conditions.

It will naturally be clear that the stores within the gateways 8 need not be physically co-located with other components thereof, provided they are connected via a signalling link.

Whilst, in the foregoing, the term "global" is used, and it is preferred that the satellite system should cover all or a substantial part of the globe, the invention extends also to similar systems with more restricted coverage (for example of one or more continents).

It will be understood that the geographical locations of the various components of the invention are not important, and that different parts of the system of the above embodiments may be provided in different national jurisdictions. For the avoidance of doubt, the present invention extends to any part or component of telecommunications apparatus or systems which contributes to the inventive concept of selectively defining local and global system users, and treating the two differently Furthermore, criteria other than user status may be employed to select between the PSTN and the dedicated ground network; for example, traffic loading conditions may be taken into account as well as or instead of user status.

The foregoing, and all other variants, embodiments, modifications or improvements to the invention are intended to be comprised within the present invention.

What is claimed is:

1. A communication system for communication with a plurality of mobile terminals (2), the system comprising:
   a plurality of orbiting satellites (4);
   a plurality of earth stations (6) arranged to communicate with the mobile users via the satellites;
   a plurality of gateway stations (8) for interconnecting terrestrial equipment with the earth stations (6); and
   a store (54) for storing access data for said mobile terminals (2);
   characterised in that;
   the mobile terminals (2) are divided into first and second categories, the store (54) retaining corresponding different status information, both said first and second categories communicating with said satellites (4), and in that there are provided;
   first and second different communications channels (14; 10, 21) between said gateway stations (8) and said earth stations (6), and in that there is provided;
   a route control device (72) for selecting one of said first and second channels, in dependence upon the category of a mobile terminal.

2. A system according to claim 1, in which said first category is a local category associated with a limited permitted geographical range of said mobile terminal (2).

3. A system according to claim 1, in which said first category is a local category defining a limited permitted part of said system with which said mobile terminal (2) may communicate.

4. A system according to claim 1, in which said second category is a global category specifying that said mobile terminal (2) may communicate with any part of said system.

5. A system according to claim 1, in which said first communication channel comprises a dedicated ground network (14) interconnecting said earth stations and said gateway stations.

6. A system according to claim 5, in which said ground network (14) comprises leased lines.

7. A system according to claim 5 or claim 6, in which said ground network (14) comprises virtual circuits provided over shared lines.

8. A system according to claim 5, 6 or 7 in which said ground network (14) comprises terrestrial lines in preference to satellite links.

9. A system according to claim 5, in which said ground network comprises trunk connections (14c) between said earth stations (6), and further comprises spur links (14a, 14b) from the earth stations (6) to the gateway stations (8) and in which there are provided routing switches (44) at said earth a stations.

10. A system according to claim 1, in which said second channel comprises an international public switched network link (21).

11. A system according to claim 1, in which said store (54) is provided at one or more central storage stations (15), communicating with said earth stations (6) and/or said gateway stations (8) via a signalling channel (60).

12. A system according to claim 1, in which said store (54) is arranged to store, for the mobile terminals (2), position information specifying the position of the mobile terminals (2).

13. A system according to claim 1, in which said gateway stations (8) are associated with terminal home stores (76), and said mobile terminals (2) are each assigned to a said home store (76).

14. A system according to claim 13, in which said home stores (76) are arranged to store billing data for mobile terminals (2) assigned thereto.

15. A system according to claim 14, in which said billing data represents a different charge for said mobile terminals (2) of said first category to that of mobile terminals (2) of said second category.

16. A system according to claim 1, further comprising a device (58) for altering the category of a mobile terminal (2), and for changing the status information held in the store (54) correspondingly.

17. Satellite system routing equipment (8) for interconnecting a mobile terminal (2) satellite communications system (4, 6, 14) with a terrestrial communications link, said equipment comprising a routing switch (70) for selectively interconnecting said communications link with one of first and second communications channels (14; 10, 21), either of which connects to said mobile terminal (2) via a communications satellite (4) and an earth station (6), depending upon whether said mobile terminal (2) falls into first or second predetermined categories.

18. Equipment according to claim 17, further comprising a terminal home store (76) for storing billing data for a plurality of mobile terminals (2) associated with the home store (76).

19. Equipment according to claim 18, further comprising means (74) for receiving billing data from said mobile terminal satellite communications system and for updating said home store (76).

20. Equipment according to claim 17, in which said communications link comprises a telecommunications network (10), said equipment comprising a gateway (8) between said telecommunications network (10) and said mobile terminal satellite communications system, and said second communications channel (10) comprises the same telecommunications network.

21. Satellite system routing equipment (6) for interconnecting a mobile terminal (2), communicating via a satellite link with said equipment (6), with a called terminal (12), the equipment comprising a routing switch (44) for selectively interconnecting said satellite link with one of first and second communications channels (14; 10, 21), either of which connects to said called terminal (12), depending upon whether said mobile terminal (2) falls into first or second predetermined categories.

22. Equipment according to claim 21, in which the routing switch (44) comprises an exchange for interconnecting portions of said first channel (14).

23. Equipment according to claim 21, comprising a satellite earth station (6).

24. Equipment according to claim 17 or claim 21, further comprising a signalling circuit for signalling a routing request signal, indicating the identity of a mobile terminal (2) communicating on said satellite link, to a store (54) and for receiving a reply signal, said equipment selecting either said first or said second channel in dependence upon said reply signal.

25. Equipment according to claim 17 or claim 21, in which said first communications channel comprises a dedicated ground network (14) connected to said earth station (6).

26. Equipment according to claim 25, in which said ground network (14) comprises a leased line.

27. Equipment according to claim 25, in which said ground network (14) comprises a virtual circuit provided over a shared line.

28. Equipment according to claim 17 or claim 21, in which said second communications channel comprises an international public switched network (21).

29. A method of connecting a mobile terminal (2), via a satellite (4) and a satellite earth station (6), with a terrestrial communications link, comprising selecting one of two alternative routes (14; 10, 21) between the earth station (6) and the communications link depending on whether the mobile terminal (2) is within first or second categories.

30. A system for interconnecting a mobile terminal satellite commmnications system with a terrestrial communications link, said system comprising:

first and second communications channels;

routing means for selectively interconnecting said communications link with one of said first and second communications channels, either of said channels connecting to said mobile terminal via a communications satellite and an earth station, said first communications channel connecting via the public switched telecommunications network and said second communications channel connecting via a satellite system ground network.

31. A method of interconnecting a satellite mobile communications system user terminal and another telecommunications user terminal, comprising determining a plurality of possible earth stations via which said satellite system user terminal could communicate via a satellite; measuring received link quality for signals received from said satellite system user terminal via said plurality of earth stations: selecting one of said plurality of earth stations according to at least said received link quality; and interconnecting the two user terminals via said selected earth station.

32. A method according to claim 31 further comprising a step of determining the position of said satellite system user terminal (2).

33. A method according to claim 31 in which said earth station is further selected according to a predicted link quality criterion taking into account stored satellite ephemeris data.

34. A method according to claim 31 in which the said other telecommunications terminal apparatus (12) is interconnected via one of said plurality of earth stations (6), and further comprising a step of determining whether said one of said plurality of earth stations (6) will exhibit a satisfactory link quality as the earth station via which said satellite system user terminal (2) is accessed.

35. A method according to claim 34 in which a call is directed from said other telecommunications terminal (12) to said satellite system user terminal (2), said one of said earth stations (6) comprising an origin for said call.

36. A method according to claim 34 in which a call is directed to said other telecommunications terminal (12) from said satellite system user terminal (12), said one of said earth stations (6) comprising a destination for said call.

37. A method according to claim 31 further comprising a step of assessing traffic conditions via each of said plurality of earth stations (6).

38. A method according to claim 31 in which said satellite system user terminal (2) is associated with a predetermined category of a plurality of said categories, and in which said selection depends upon said user category.

39. Apparatus for selecting one of a plurality of earth stations for interconnecting a satellite mobile communications system user terminal and another telecommunications user terminal comprising:

means for determining said plurality of possible earth stations via which said satellite system user terminal could communicate via a satellite;

means for measuring received link quality for signals received from said satellite system user terminals via said plurality of earth stations; and means for selecting one of said plurality of earth stations according to at least said received link quality.

40. A method of interconnecting a satellite mobile communication user terminal and another telecommunications user terminal, comprising the steps of determining a plurality of possible earth stations via which said satellite system user terminal could communicate via a satellite, each of said plurality of earth stations being connected to a dedicated ground network;

selecting one of said plurality of earth stations; and interconnecting the two user terminals via said selected earth station through said dedicated ground network.

* * * * *

UNITED STATES PATENT AND TRADEMARK OFFICE
CERTIFICATE OF CORRECTION

PATENT NO. : 6,370,126 B1  Page 1 of 1
DATED : April 9, 2002
INVENTOR(S) : Jan De Baere et al.

It is certified that error appears in the above-identified patent and that said Letters Patent is hereby corrected as shown below:

Title page,
Item [56], References Cited, U.S. PATENT DOCUMENTS, insert:

```
-- 5,365,451   11/94   Wang et al.        455/13.1
   5,394,561   02/95   Freeburg           455/13.1
   5,509,004   04/96   Bishop, Jr. et al. 370/331 --
```

Column 18,
Line 18, "a" has been removed;

Column 19,
Line 43, "commmnications" has been replaced with -- communications --;

Column 20,
Line 47, "communication user" has been replaced with -- communications system user --.

Signed and Sealed this

Eleventh Day of March, 2003

JAMES E. ROGAN
*Director of the United States Patent and Trademark Office*